(12) United States Patent
Goodman et al.

(10) Patent No.: US 11,060,454 B2
(45) Date of Patent: Jul. 13, 2021

(54) METHOD OF REGULATING AIR PRESSURE IN ANTI-ICING SYSTEM

(71) Applicant: United Technologies Corporation, Farmington, CT (US)

(72) Inventors: Robert Goodman, West Hartford, CT (US); Zhijun Zheng, Avon, CT (US); Michael D. Greenberg, Bloomfield, CT (US)

(73) Assignee: Raytheon Technologies Corporation, Farmington, CT (US)

(*) Notice: Subject to any disclaimer, the term of this patent is extended or adjusted under 35 U.S.C. 154(b) by 1 day.

(21) Appl. No.: 16/567,665

(22) Filed: Sep. 11, 2019

(65) Prior Publication Data
US 2020/0003117 A1 Jan. 2, 2020

Related U.S. Application Data

(62) Division of application No. 15/202,758, filed on Jul. 6, 2016, now Pat. No. 10,450,955.

(51) Int. Cl.
*F02C 7/047* (2006.01)
*F01D 25/02* (2006.01)
(Continued)

(52) U.S. Cl.
CPC .............. *F02C 7/047* (2013.01); *B64D 15/04* (2013.01); *B64D 33/02* (2013.01); *F01D 11/24* (2013.01);
(Continued)

(58) Field of Classification Search
CPC ................... B64D 15/04; B64D 33/02; B64D 2033/0286; B64D 2033/0233
See application file for complete search history.

(56) References Cited

U.S. PATENT DOCUMENTS 3,741,610 A 6/1973 Holland
4,106,510 A 8/1978 Hakim et al.
(Continued)

FOREIGN PATENT DOCUMENTS

EP 1508734 A1 2/2005
EP 3034813 A1 12/2015
(Continued)

OTHER PUBLICATIONS

Pressure-Compensated Flow Control Valves, website <http://www.valvehydraulic.info/creation-and-control-of-fluid-low/pressure-compensated-flow-control-valves.html>, 3 pages, visited Feb. 4, 2016.
(Continued)

*Primary Examiner* — Brian P Wolcott
(74) *Attorney, Agent, or Firm* — Kinney & Lange, P.A.

(57) ABSTRACT

An anti-icing system of a nacelle inlet of an engine of an aircraft includes first and second direct acting valves and first and second control valve assemblies fluidly connected to the nacelle inlet. The first direct acting valve includes a first inlet, outlet, valve chamber, and piston. The first piston is positioned in the first direct acting valve. The first control valve assembly is fluidly connected to the first valve. The second direct acting valve includes a second inlet, outlet, valve chamber, and piston. The second piston is positioned in the second direct acting valve. The second direct acting valve is fluidly connected to the first direct acting valve in a series configuration. The second control valve assembly is fluidly connected to the second valve chamber.

15 Claims, 9 Drawing Sheets

(51) Int. Cl.
*F01D 25/08* (2006.01)
*F01D 11/24* (2006.01)
*B64D 15/04* (2006.01)
*B64D 33/02* (2006.01)
*F02C 9/16* (2006.01)

(52) U.S. Cl.
CPC ............ *F01D 25/02* (2013.01); *F01D 25/08* (2013.01); *F02C 9/16* (2013.01); *B64D 2033/0233* (2013.01); *B64D 2033/0286* (2013.01); *F05D 2220/32* (2013.01)

(56) References Cited

U.S. PATENT DOCUMENTS

| | | | |
|---|---|---|---|
| 4,318,070 A | | 3/1982 | Dohrmann et al. |
| 4,688,745 A | | 8/1987 | Rosenthal |
| 4,831,819 A | | 5/1989 | Norris et al. |
| 5,257,498 A | | 11/1993 | Nikkanen et al. |
| 6,102,364 A | | 8/2000 | Busato |
| 6,644,350 B1 * | | 11/2003 | Douglass ................ F16D 25/14 137/596.17 |
| 7,131,612 B2 | | 11/2006 | Baptist et al. |
| 7,780,117 B2 | | 8/2010 | Botura et al. |
| 7,909,261 B2 | | 3/2011 | Ellstrom et al. |
| 7,959,109 B2 * | | 6/2011 | Dasilva ................ B64D 15/04 244/134 R |
| 8,560,203 B2 | | 10/2013 | Calandra et al. |
| 8,572,985 B2 | | 11/2013 | Waddleton |
| 8,910,653 B2 * | | 12/2014 | McAuliffe .......... F16K 31/1226 137/220 |
| 9,169,779 B2 | | 10/2015 | Winter |
| 9,849,992 B2 * | | 12/2017 | Goodman ............. B64D 33/02 |
| 10,046,859 B2 * | | 8/2018 | Jones ....................... F16K 3/267 |
| 2010/0154987 A1 | | 6/2010 | Vontell, Sr. |
| 2012/0017552 A1* | | 1/2012 | McAuliffe ......... B01D 46/0021 55/418 |
| 2014/0150902 A1 | | 6/2014 | Pirat |
| 2015/0034767 A1 | | 2/2015 | Pirat |
| 2017/0336812 A1* | | 11/2017 | Dante .................. F16K 17/048 |
| 2018/0170556 A1* | | 6/2018 | Goodman ............. F16K 3/265 |

FOREIGN PATENT DOCUMENTS

| | | | | |
|---|---|---|---|---|
| EP | 3045699 A1 | 7/2016 | | |
| GB | 1295092 | 11/1972 | | |
| GB | 1295092 A | * 11/1972 | ............ | F01D 25/02 |
| GB | 1345351 | 1/1974 | | |
| WO | WO2015/130384 A2 | 9/2015 | | |

OTHER PUBLICATIONS

Parker, TPC Pressure, Temperature Compensated Flow Control Valve, website <(b) http://www.parker.com/portal/site/PARKER/menuitem.de7b26ee6a659c147cf26710237ad1ca/?vgnextoid=fcc9b5bbec622110VgnVCM10000032a11dacRCRD&vgnextchannel=fcc9b5bbec622110VgnVCM10000032a71dacRCRD&vgnextfmt=default&vgnextdiv=687505&vgnextcatid=1537967&vgnextcat=TPC+PRESSURE%2C+TEMPERATURE+COMPENSATED+FLOW+CONTROL++VALVE&Wtky=>, 4 pages, visited Feb. 4, 2016.
Extended European Search Report for EP Application No. 17180012.1, dated Nov. 7, 2017, 13 Pages.

* cited by examiner

METHOD OF REGULATING AIR PRESSURE IN ANTI-ICING SYSTEM

CROSS-REFERENCE TO RELATED APPLICATION(S)

This application is a divisional of U.S. application Ser. No. 15/202,758, filed Jul. 6, 2016 for "NACELLE ANTI ICE SYSTEM" by R. Goodman, Z. Zheng, and M. Greenberg.

BACKGROUND

The present disclosure relates generally to pressure regulation systems, and more particularly to direct acting valves used in anti-icing systems for aircraft.

Operation of aircraft engines in adverse weather conditions or at high altitudes can sometimes lead to ice forming on the exposed surfaces of the engine nacelle inlet. The build-up of ice on a nacelle surrounding the engine limits the quantity of air being fed to the engine. This reduction in inlet airflow can result in a reduction of power output, efficiency and/or cooling capacity of the engine. Engine inlet anti-icing systems commonly employ a thermal source, such as hot air bled from the engine core, which is applied to the nacelle inlet to prevent ice build-up on the external surfaces of the nacelle inlet.

Another concern with aircraft engines is the useful life of the aircraft engine and components. The build-up of ice near the inlet of the engine may lead to large pieces of ice breaking loose from the inlet and flowing into the engine. Ice flowing into and through the engine may damage components within the engine, such as airfoils, and components attached to the nacelle, such as inlet acoustic panels. The damaged components may then require repair or replacement.

Current anti-icing systems include valves that do not compensate for increases in air temperature with increasing bleed pressure and, as a result, a delivered heat flux can result in damage to the nacelle from overheating.

SUMMARY

An anti-icing system of a nacelle inlet of an engine of an aircraft includes a valve assembly fluidly connected to the nacelle inlet. The valve assembly includes first and second direct acting valves and first and second control valve assemblies. The first direct acting valve includes a first inlet, a first valve chamber fluidly connected to the first inlet, a first internal valve body circumferentially surrounding the first valve chamber, a first outlet, and a first piston for adjusting a rate of flow of air through the first direct acting valve. The first piston is slidably engaged with the first internal valve body. The first control valve assembly is fluidly connected to the first valve chamber of the first direct acting valve. The second direct acting valve includes a second inlet, a second valve chamber fluidly connected to the second inlet, a second internal valve body circumferentially surrounding the second valve chamber, a second outlet, and a second piston for adjusting a rate of flow of air through the second direct acting valve. The second piston is slidably engaged with the second internal valve body. The second direct acting valve is fluidly connected to the first direct acting valve in a series configuration such that the second inlet of the second direct acting valve is directly connected to the first outlet of the first direct acting valve. The second control valve assembly is fluidly connected to the second valve chamber of the second direct acting valve.

A method of regulating air pressure in an anti-icing system of a nacelle inlet of an engine of an aircraft includes flowing air into a valve assembly. The valve assembly includes first and second direct acting valves and first and second control valve assemblies. The first direct acting valve includes a first valve chamber, a first internal valve body, and a first piston slidably engaged with the first internal valve body. The first control valve assembly is fluidly connected to the first valve chamber of the first direct acting valve. The second direct acting valve includes a second valve chamber, a second internal valve body, and a second piston slidably engaged with the second internal valve body. The second direct acting valve is fluidly connected to the first direct acting valve in a series configuration. The second control valve assembly is fluidly connected to the second valve chamber of the second direct acting valve. A heat flux of the nacelle inlet of the engine of the aircraft is controlled by the following steps. At least one of the first control valve assembly and the second control valve assembly are adjusted in response to the temperature of the air in the outlet of the second direct acting valve by controlling an amount of electrical current fed into at least one of a first solenoid valve in the first control valve assembly and a second solenoid valve in the second control valve assembly. A rate of flow of air released into an ambient environment external to the valve assembly out of the at least one of the first control valve assembly and the second control valve assembly is adjusted. At least one of the first direct acting valve and the second direct acting valve is moved by adjusting a pressure of air in at least one of the first pressure chamber of the first direct acting valve and the second pressure chamber of the second direct acting valve. A rate of flow of the air out of the valve assembly is adjusted by adjusting a rate of flow of air past the at least one of the first piston and the second piston. A pressure of air flowing out of an outlet of the second direct acting valve is controlled in response to the adjusted rate of flow of air out of the valve assembly. The air from the outlet of the valve assembly is transported to the nacelle inlet of the engine of the aircraft.

A method of regulating air pressure in an anti-icing system of a nacelle inlet of an engine of an aircraft includes flowing air into a valve assembly. The valve assembly includes first and second direct acting valves and first and second control valve assemblies. The first direct acting valve includes a first valve chamber, a first internal valve body surrounding the first valve chamber, and a first piston slidably engaged with the first internal valve body. The first control valve assembly is fluidly connected to a first valve chamber of the first direct acting valve. The first control valve assembly includes a first solenoid with a first ball element, a first plunger attached to the first ball element, and a first solenoid surrounding the first plunger, the first solenoid for creating a magnetic field to interact with the first plunger. The second direct acting valve is fluidly connected to the first direct acting valve in a series configuration. The second direct acting valve includes a second valve chamber, a second internal valve body surrounding the second valve chamber, and a second piston slidably engaged with the second internal valve body. The second control valve assembly is fluidly connected to a second valve chamber of the second direct acting valve. The second control valve assembly includes a second solenoid with a second ball element, a second plunger attached to the second ball element, and a second solenoid surrounding the second plunger, the second solenoid for creating a magnetic field to interact with the second plunger. A heat flux of the nacelle inlet of the engine of the aircraft is controlled with the following steps. At least one of a first solenoid valve in the first control valve assembly and a second solenoid valve in the second control valve assembly are energized by feeding an electric current through the at least one of the first solenoid in the first control valve assembly and the second solenoid in the second control valve assembly. A rate of flow of air released into an ambient environment external to the valve assembly out of at least one of the first control valve assembly and the second control valve assembly is increased by opening the at least one of the first solenoid valve in the first control valve assembly and the second solenoid valve in the second control valve assembly in response to the electric current. A pressure of air in at least one of a first pressure chamber of the first direct acting valve and a second pressure chamber of the second direct acting valve is decreased by decreasing a pressure of the air in the at least one of the first control valve assembly and the second control valve assembly in response to the increased rate of flow of air released into the ambient environment external to the valve assembly out of the at least one of the first control valve assembly and the second control valve assembly. The at least one of the first piston of the first direct acting valve and the second piston of the second direct acting valve are moved from an open position into a closed position such that the closed position allows a lesser amount of air to flow past the at least one of the first piston and second piston than the open position by decreasing an effective area between the first internal valve body and the first piston or between the second internal valve body and the second piston. A rate of flow of air past the at least one of the first piston and the second piston is reduced in response to decreasing the effective area between the first internal valve body and the first piston or between the second internal valve body and the second piston. A pressure of air flowing out of an outlet of the second direct acting valve is reduced in response to reducing the rate of flow of air past the at least one of the first piston and the second piston. The air from the outlet of the valve assembly is transported to the nacelle inlet of the engine of the aircraft.

DETAILED DESCRIPTION

The present disclosure describes non-limiting examples which provide a system for maintaining the metal temperature of the nacelle inlet as higher pressure and higher temperature air is supplied to the nacelle inlet, with the system including redundancy and a temperature probe for indicating over-temperature. The non-limiting examples discussed in this disclosure include controlling a pressure regulation set-point of a valve assembly such that when the pressure from the air to the valve assembly is high and associated temperature is hotter, control valve assemblies cause a reduction in a regulated output pressure, which results in maintaining an approximately fixed heat load to a nacelle inlet of an engine. First and second control valve assemblies, both with adjustable solenoid and pintle valves, can be adjusted and used to release air into an ambient environment external to the control valve assemblies, thereby adjusting the pressure bias of first and second direct acting valves operating in series. Under normal operating conditions, only the first direct acting valve is regulating while the second direct acting valve is fully open due to the second direct acting valve's regulation pressure set-point being set higher than that of the first direct valve. The biased valve assembly allows the pressure set-point to be raised slightly higher when the pressure from the air to the valve assembly is low and associated temperature is lower, to ensure any ice is fully melted and to not overheat the engine inlet when both the pressure and temperature are higher.

Figure 1:
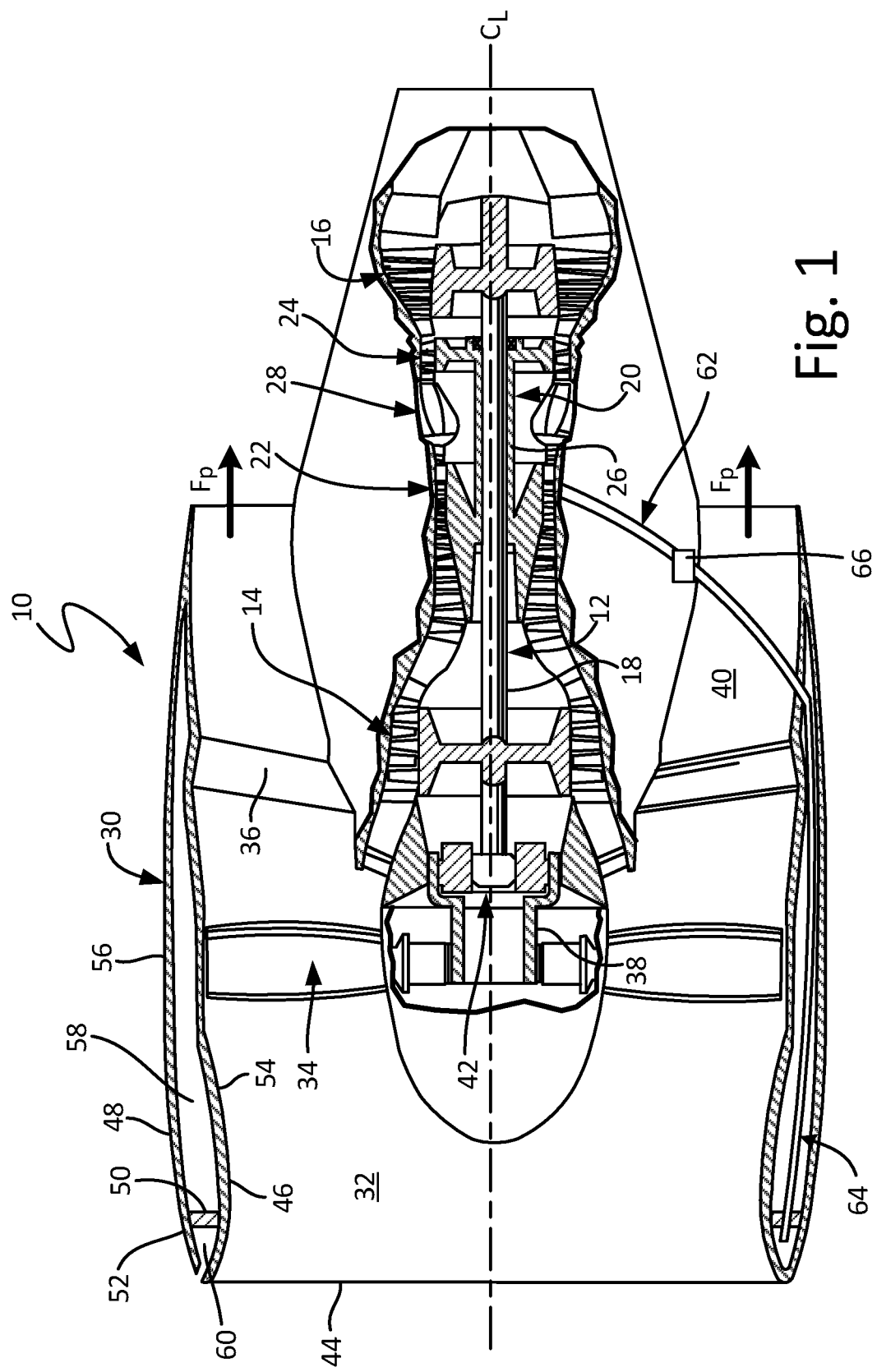
FIG. 1 is a cross-sectional view of a gas turbine engine.

FIG. 1 is a cross-sectional view of gas turbine engine 10, in a two-spool turbofan configuration for use as a propulsion engine on an aircraft. As shown in the figure, low spool 12 includes low pressure compressor ("LPC") 14 and low pressure turbine ("LPT") 16, rotationally coupled via low pressure shaft 18. High spool 20 includes high pressure compressor ("HPC") 22 and high pressure turbine ("HPT") 24, rotationally coupled via high pressure shaft 26. High spool 20 is coaxially oriented about low spool 12, along engine centerline (or turbine axis) $C_L$, with combustor 28 positioned in flow series between high pressure compressor 22 and high pressure turbine 24.

Nacelle 30 is oriented about the forward end of gas turbine engine 10. Fan casing 32 extends along on the radially inner surface of nacelle 30, from propulsion fan 34 to fan exit guide vane 36. Propulsion fan 34 is rotationally coupled to low spool 12 via fan shaft 38, generating propulsive flow $F_P$ through fan duct (or bypass duct) 40. In advanced engine designs, fan drive gear system 42 couples fan shaft 38 to low spool 12 at low pressure shaft 18, providing independent fan speed control for reduced noise, emissions, and improved operating efficiency.

Nacelle 30 extends forward of the gas turbine engine 10 and defines inlet 44 for incoming fluid. Nacelle 30 includes inner barrel 46, outer barrel 48, bulkhead 50, and inlet shell 52. Inner barrel 46 defines radially outer flow surface 54 for a portion of the flowpath of gas turbine engine 10. Outer barrel 48 defines outer flow surface 56 for the external medium flowing about gas turbine engine 10. A radial separation between inner barrel 46 and outer barrel 48 defines annular chamber 58 there between. Inlet shell 52 is the leading edge for nacelle 30. Inlet shell 52 and bulkhead 50 bound annular shell cavity 60.

Fluid pressure regulation system 62 is fluidly connected to HPC 22 and extends into annular chamber 58. Anti-icing system 64 is positioned within nacelle 30 and transfers fluid, in this example air, into annular shell cavity 60. Fluid pressure regulation system 62 includes valve assembly 66 which can be made up of one or more of a variety of valves and flow regulators to control the flow of air through fluid pressure regulation system 62 (as will be discussed with respect to the remaining figures). In other non-limiting embodiments, fluid pressure regulation system 62 can extend along the interior of annular chamber 58 before introducing air into annular shell cavity 60.

Figure 2A:
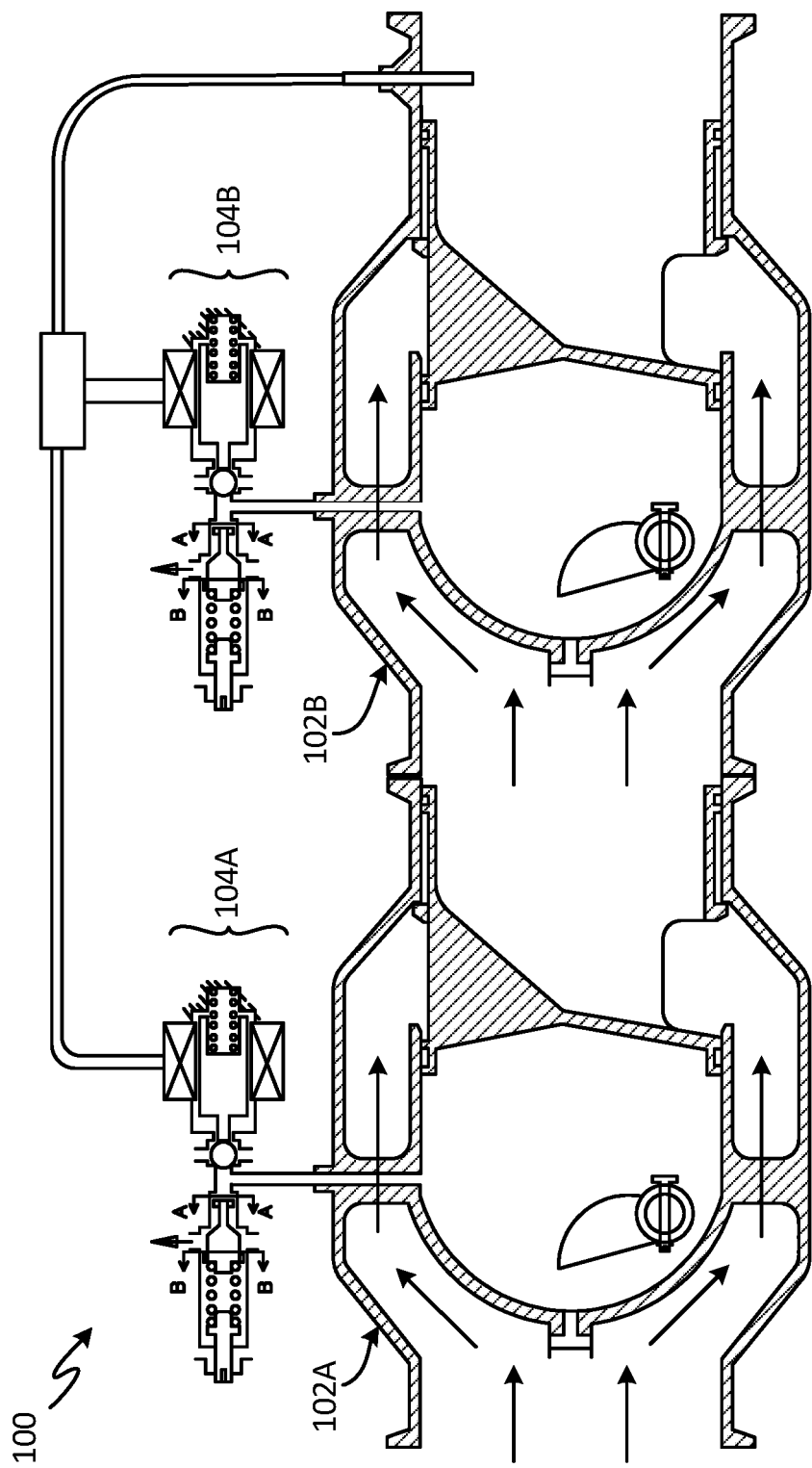
FIG. 2A is a cross-sectional view of a valve assembly with a first and second pressure valve and first and second control valves.

FIG. 2A is a cross-sectional view of valve assembly 100, which can be used as or with valve assembly 66 in FIG. 1. The major components of valve assembly 100 include first direct acting valve 102A, first control valve assembly 104A, second direct acting valve 102B, and second control valve assembly 104B. First direct acting valve 102A and second direct acting valve 102B include non-limiting examples of direct acting valves that regulate outlet pressure exiting from valve assembly 100.

First direct acting valve 102A is fluidly connected to second direct acting valve 102B in a series configuration. First control valve assembly 104A is fluidly connected to first direct acting valve 102A and second control valve assembly 104B is fluidly connected to second direct acting valve 102B.

Direct acting valves are characterized in their capability of the regulating piston to react immediately to fluctuations of inlet pressure as compared to other types of valves, such as servo-regulated valves which sense downstream pressure and then move an upstream valve. Non-direct acting valves typically include delays and/or time-lag between the time a valve controller reacts to downstream pressure and a servo-piston adjusts to in order to regulate outlet pressure.

Valve assembly 100 is an example of two direct acting valves in a series configuration with corresponding controllers to adjust servo pressures to modulate regulating valves and control regulated pressure. Valve assembly 100 includes two of the same, direct acting type pressure regulating valves in series, with first direct acting valve 102A acting as the primary pressure regulator under normal operating conditions and second direct acting valve 102B acting as a backup in case of a failure of the primary. Normally, because a set-point of second direct acting valve 102B is set higher than a set-point of first direct acting valve 102A, second direct acting valve 102B remains fully open while first direct acting valve 102A regulates downstream pressure. In the event of a failure condition, first direct acting valve 102A would be locked open and second direct acting valve 102B would provide pressure regulated air to the cowl. Utilizing a direct acting valve rather than a servo actuated valve reduces pressure overshoots for rapid inlet pressure transients. Valve assembly 100 uses two of the same direct acting valves with different set points which adds cost reduction and simplicity.

Figure 2B:
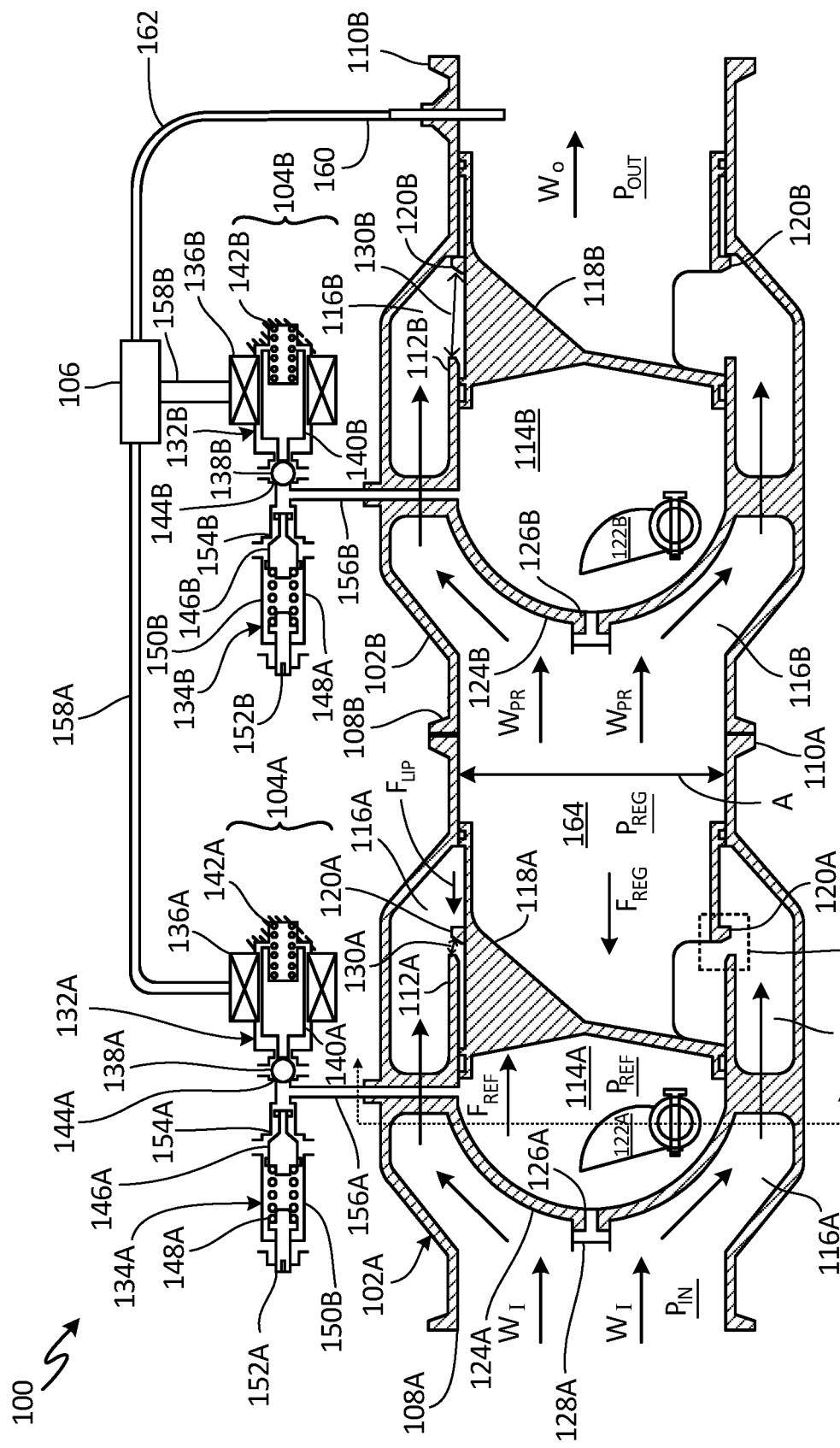
FIG. 2B is a cross-sectional view of the valve assembly with the first and second pressure valve and first and second control valves shown in greater detail.

FIG. 2B is a cross-sectional view of valve assembly 100 from FIG. 2A shown in greater detail. Valve assembly 100 includes first direct acting valve 102A, first control valve assembly 104A, second direct acting valve 102B, second control valve assembly 104B, and full authority digital engine control ("FADEC") 106 of the aircraft or some other source to open or shut first direct acting valve 102A and second direct acting valve 102B either individually or simultaneously.

First direct acting valve 102A includes first inlet 108A, first outlet 110A, first internal valve body 112A, first valve chamber 114A, first outer flow chamber 116A, first piston 118A, first lip element 120A, first lock mechanism 122A, first upstream wall 124A, first hole 126A, and first orifice plug 128A. First direct acting valve 102A and second direct acting valve 102B include non-limiting examples of direct acting valves that regulate outlet pressure exiting from valve assembly 100.

First inlet 108A is an orifice in first direct acting valve 102A. First inlet 108A is fluidly connected to HPC 22 through fluid regulation system 62 (as seen in FIG. 1). First inlet 108A provides an opening through which flow $W_I$ of air from fluid regulation system 62 (from FIG. 1) enters into first direct acting valve 102A. First outlet 110A is an orifice in first direct acting valve 102A. First outlet 110A provides an opening through which partially regulated flow $W_{PR}$ of air is transferred from first direct acting valve 102A to second direct acting valve 102B.

First valve chamber 114A is positioned within first direct acting valve 102A. First valve chamber 114A is bounded in an upstream direction by first upstream wall 124A, in a downstream direction by first piston 118A, and in a radial direction by first internal valve body 112A of first direct acting valve 102A. First valve chamber 114A is fluidly connected to first inlet 108A by first hole 126A in first upstream wall 124A.

First piston 118A is a pressure regulating element positioned within first direct acting valve 102A. First piston 118A is slidably engaged with first internal valve body 112A of first direct acting valve 102A such that first piston 118A is capable of translating linearly within first direct acting valve 102A from a fully open position to a fully closed position. For example, in FIG. 2B first piston 118A is shown in a partially open position. First piston 118A includes first lip element 120A. First lip element 120A is located on an upstream end of first piston 118A and extends outwardly in a generally radial direction from first piston 118A. First lip element 120A can be monolithically formed with or connected to first piston 118A, and in other non-limiting embodiments first lip element 120A can be attached to first piston 118A through physical or chemical attachment means. First throat 130A extends between first internal valve body 112A and first lip element 120A forming a passage from first outer flow chamber 116A to first outlet 110A. A distance of first throat 130A determines an effective area of flow through first throat 130A by forming a circumferential or annular gap between first internal valve body 112A and first lip element 120A through which flow $W_I$ of air transfers from first outer flow chamber 116A to first outlet 110A.

Valve assembly 100 also includes first lock mechanism 122A positioned in first valve chamber 114A of first direct acting valve 102A. First lock mechanism 122A is rotatably connected to first direct acting valve 102A. In FIG. 2B, first locking mechanism 122A is shown in an un-locked position.

First direct acting valve 102A also includes first hole 126A positioned on first upstream wall 124A of first valve chamber 114A. In one non-limiting example, the diameter of first hole 126A can include a diameter of approximately 0.020 to 0.030 inches (0.051 to 0.0762 centimeters). First hole 126A fluidly connects first inlet 108A with first valve chamber 114A. In valve assembly 100, flow $W_I$ of air from fluid regulation system 62 flows into first valve chamber 114A through first hole 126A and directly adjusts the pressure within first valve chamber 114A.

In FIG. 2B, valve assembly 100 is shown with first orifice plug 128A positioned in first hole 126A. First orifice plug 128A is removably positioned in first hole 126A in upstream wall 142A of first valve chamber 114A. First orifice plug 128A includes a passage and provides contamination resistance of flow $W_I$ of air from fluid regulation system 62 as flow $W_I$ of air enters into first valve chamber 114A by forcing flow $W_I$ of air to turn into first orifice plug 128A, through first orifice plug 128A, and into first valve chamber 114A.

First direct acting valve 102A is configured such that first piston 118A moves along a linear pathway in response the change in pressure in first valve chamber 114A due to a change in flow $W_I$ of air from fluid regulation system 62 entering into first valve chamber 114A through first hole 126A. In some non-limiting embodiments, the term move is synonymous with translate, actuate, slide, adjust, modulate, change position, and other terms relating to lateral positional adjustment. The positioning of first piston 118A regulates an amount of partially regulated flow $W_{PR}$ of air flowing from first outlet 110A to second direct acting valve 102B by controlling an effective area that flow $W_I$ of air passes through as flow $W_I$ of air travels through first direct acting valve 102A, past first lip element 120A of first piston 118A, and through first outlet 110A.

First lip element 120A experiences closing force $F_{LIP}$ on first lip element 120A as a function of inlet pressure. There is a static pressure distribution on first piston 118A due to closing force $F_{LIP}$ on first lip element 120A in an upstream direction (to the left in FIG. 2B) and bias force $F_{REF}$ acting on first piston 118A in a downstream direction (to the right in FIG. 2B). As will be discussed further in FIGS. 3A-3B, the static pressure distribution is a function of the lip geometry of first lip element 120A and can be altered by changing the geometry (e.g., angle) of first lip element 120A.

Under normal operating conditions, first lock mechanism 122A occupies an un-locked position (shown in FIG. 2B) such that first piston 118A is allowed to travel or move between a fully open position and a fully closed position. First lock mechanism does not block or impede movement of first piston 118A when first lock mechanism 122A occupies the un-locked position. In an event of a failure of first control valve assembly 104A, first lock mechanism 122A can be toggled into a locked position which locks first piston 118A into a fully open position (to the right of FIG. 2B). See FIGS. 2C and 4 for additional discussion of first locking mechanism 122A.

First control valve assembly 104A includes first solenoid valve 132A and first pintle valve 134A. First solenoid valve 132A includes first solenoid 136A, first ball element 138A, first plunger 140A, first solenoid spring 142A, and first solenoid seat 144A.

First solenoid valve 132A includes an electrically controllable release valve for releasing air from first valve chamber 114A into an ambient environment external to valve assembly 100. First solenoid 136A includes a solenoid for producing a magnetic field upon the application of electric current to first solenoid 136A. First ball element 138A includes a valve element for controlling an effective area of flow through which air can flow past first ball element 138A, out of first solenoid valve 132A, and into the ambient environment external to valve assembly 100. First ball element 138A is attached to or is in contact with first plunger 140A. First plunger 140A includes magnetic material for interacting with the magnetic field produced by first solenoid 136A. In a non-limiting example, first ball element 138A and first plunger 140A can be formed from a single piece of material, or alternatively can be connected through physical or chemical attachment means. First solenoid spring 142A includes first spring 142A for biasing first plunger 140A to the left in FIG. 2B, by pushing against first plunger 140A. First solenoid seat 144A includes an annular sealing element for sealing engagement with first ball element 138A.

First pintle valve 134A includes first pintle 146A, first pintle spring 148A, first pintle housing 150A, first threadably adjustable biasing element 152A, and first pintle seat 154A.

First pintle valve 134A provides a non-limiting adjustable release valve for releasing air from first valve chamber 114A into an ambient environment external to valve assembly 100. First pintle 146A of first pintle valve 134A includes a conical shaped element that is slidably engaged with first pintle housing 150A. In other non-limiting embodiments, first pintle valve 134A can include non-conical configurations such as a simple ball. First pintle spring 148A includes a spring element for biasing first pintle 146A to the right in FIG. 2B, by pushing against first pintle 132 and first threadably adjustable biasing element 152A. First threadably adjustable biasing element 152A includes a threadably adjustable element for threadably adjusting the tension, or spring-force, in first pintle spring 148A. First pintle seat 154A includes an annular sealing element for sealing engagement with first pintle 146A.

First valve chamber 114A is fluidly connected to first control assembly 104A. First solenoid valve 132A and first pintle valve 134A are fluidly connected to first valve chamber 114A by first line 156A. First solenoid valve 132A and first pintle valve 134A are also fluidly connected to each other by first line 156A. First solenoid valve 132A and first pintle valve 134A function either separately or in tandem to control the amount of air released into the ambient environment external to valve assembly 100 thereby controlling amount of $P_{REF}$ within first valve chamber 114A.

FADEC 106 includes a system for controlling electrical systems within the aircraft relating to performance aspects of aircraft. First control valve assembly 104A and second control valve assembly 104B are electrically connected to FADEC 106 by first wires 158A and second wires 158B respectively. First solenoid valve 132A can be electrically connected by first wires 158A to FADEC 106. Second solenoid valve 132B can be electrically connected by second wires 158B to FADEC 106.

First solenoid valve 132A can receive an electrical signal from FADEC 106 which controls first solenoid valve 132A and a position of first ball element 138A. As the electrical signal is received by, or fed into, first solenoid valve 132A, first solenoid 136A becomes energized creating a magnetic field which is applied to first plunger 140A causing first ball element 138A to actuate along a linear pathway and into an energized position. The electrical signal can be terminated to de-energize first solenoid 136A thereby reducing the magnetic field which causes first plunger 140A with first ball element 138A to actuate linearly into a de-energized position. First solenoid valve 132A can be in a default closed position, such that first ball element 138A occupies a closed positioned when first solenoid 136A is de-energized. First solenoid valve 132A includes a default closed position due to first solenoid spring 142A biasing first plunger 140A to the left in FIG. 2B so that a distal (left most) end of first plunger 140A pushes first ball element 138A against first solenoid seat 144A creating a seal preventing air from passing first ball element 138A.

Upon being energized, a magnetic field of first solenoid 136A draws first plunger 140A with first ball element 138A towards first solenoid spring 142A, thereby compressing first solenoid spring 142A, drawing first ball element 138A away from first solenoid seat 144A, and opening first solenoid valve 132A. In another non-limiting embodiment, first plunger 140A can move out of the way and air can push first ball element 138A away from first solenoid seat 144A. In other non-limiting embodiments, first solenoid valve 132A can receive electrical signals from pilot instrumentation or other various electronic controls or avionic systems of the aircraft.

In another non-limiting embodiment, first solenoid valve 132A can also include a default open configuration such that first ball element 138A occupies an open position (e.g., separated from first solenoid seat 144A) when de-energized and a closed position upon receiving an electrical signal and becoming energized. In FIG. 2B, first ball element 138A is shown in a closed position to the left of first solenoid valve 132A (and to the left in FIG. 2B), which can be either an energized or de-energized position. First solenoid valve 132A can receive the electrical signal from FADEC 106 and/or from other electronic devices in the aircraft such as pilot instrumentation or aircraft avionics.

In response to a change in pressure in first line 156A, first pintle 146A of first pintle valve 134A moves in a linear motion within first pintle housing 150A thereby causing first pintle 146A to actuate. As first pintle 146A actuates, an effective vent area of first pintle valve 134A is varied thereby releasing adjusted amounts of air out of first pintle valve 134A and into an ambient environment external to valve assembly 100 from first control valve assembly 104A. First pintle spring 148A biases first pintle 146A into a more closed position towards first pintle seat 154A (to the right in FIG. 2B). The position of first pintle 146A determines the amount of fluid allowed to pass out of first pintle valve 134A and into ambient thereby setting a resultant pressure in first valve chamber 114A of first direct acting valve 102A. For example, when first pintle 146A is positioned to the right in FIG. 2B, less venting of fluid flow from valve assembly 100 would occur thereby increasing the pressure in first valve chamber 114A and causing first piston 118A to move into a more open position. Alternatively, when first pintle 146A is positioned to the left in FIG. 2B (as shown in FIG. 2B) more venting of air out of valve assembly 100 from first control valve assembly 104A would occur thereby decreasing the pressure in first valve chamber 114A and causing first piston 118A to move to the left of FIG. 2B into a more closed position.

During operation of valve assembly 100, first control valve assembly 104A effectively controls the amount of pressure received by first valve chamber 114A. As first solenoid valve 132A and first pintle valve 134A are opened, an amount of air allowed to pass through first solenoid valve 132A and first pintle valve 134A into an ambient environment external to valve assembly 100 is increased. As the amount of air exiting first control valve assembly 104A increases, the resulting pressure within first valve chamber 114A decreases causing first piston 118A to move to the left of FIG. 2B in response the decrease in pressure in first valve chamber 114A. As first piston 118A moves to the left of FIG. 2B, an effective area of flow through first direct acting valve 102A is decreased therefore decreasing the amount of partially regulated flow $W_{PR}$ of air exiting from first outlet 110A.

As first solenoid valve 132A and first pintle valve 134A are closed, an amount of air allowed to pass through first solenoid valve 132A and into an ambient environment external to valve assembly 100 is decreased. As the amount of air exiting first control valve assembly 104A decreases, the resulting pressure within first valve chamber 114A increases causing first piston 118A to move to the right of FIG. 2B in response the increase in pressure in first valve chamber 114A. As first piston 118A moves to the right of FIG. 2B, an effective area of flow through first direct acting valve 102A is increased therefore increasing the amount of partially regulated flow $W_{PR}$ of air exiting from first outlet 110A.

Second direct acting valve 102B includes second inlet 108B, second outlet 110B, second internal valve body 112B, second valve chamber 114B, second outer flow chamber 116B, second piston 118B, second lip element 120B, second lock mechanism 122B, second upstream wall 124B, second hole 126B, second orifice plug 128B, and temperature probe 160. Second control valve assembly 104B includes second solenoid valve 132B and second pintle valve 134B. Second solenoid valve 132B includes second solenoid 136B, second ball element 138B, second plunger 140B, second solenoid spring 142B, and second solenoid seat 144B. Second pintle valve 134B includes second pintle 146B, second pintle spring 148B, second pintle housing 150B, second threadably adjustable biasing element 152B, and second pintle seat 154B.

Throughout FIG. 2B, elements corresponding to first direct acting valve 102A and first control valve assembly 104A are discussed with character reference elements that include the letter "A," while analogous elements corresponding to second direct acting valve 102B and second control valve assembly 104B are discussed with character reference elements including the letter "B." As such, the discussion of the elements of first direct acting valve 102A and first control valve assembly 104A discussed below also extends to describe the analogous elements of second direct acting valve 102B and second control valve assembly 104B. Second direct acting valve 102B and second control valve assembly 104B include all of the same elements as first direct acting valve 102A and first control valve assembly 104A. In other non-limiting embodiments, first control valve assembly 104A and second control valve assembly 104B do not include first solenoid valve 132A or second solenoid valve 132B.

Second piston 112B of second direct acting valve 102B occupies a fully open position in FIG. 2B (to the right in FIG. 2B).

In addition to the similar elements of first direct acting valve 102A, second direct acting valve 102B also includes temperature probe 160. Temperature probe 160 includes a probe for measuring temperature. Temperature probe 160 extends into second outlet 108B and into a flowpath of flow $W_O$ of air exiting valve assembly 100 out of second outlet 108B. Temperature probe 160 measures a temperature of flow $W_O$ of air. Temperature probe 160 is electrically connected to FADEC 106 by wires 162. In other non-limiting embodiments, temperature probe 160 can be electrically connected to other control elements or electronic devices of the aircraft such as pilot instrumentation or other aircraft avionics. Temperature probe 160 can alternatively be a temperature switch that is wired to relays in order to close both first direct acting valve 102A and second direct acting valve 102B without intervention by FADEC 106. In other non-limiting embodiments, temperature probe 160 can be located in adjacent downstream ducts.

Upon measuring the temperature of flow $W_O$ of air that is above a designated threshold temperature, a signal from temperature probe 160 can cause first solenoid valve 132A and second solenoid valve 132B to be energized thereby partially or fully closing first direct acting valve 102A and second direct acting valve 102B and reducing or stopping flow $W_O$ of air out of second outlet 108B. First solenoid valve 132A and second solenoid valve 132B can remain energized until the temperature of flow $W_O$ of air decreases below the designated threshold temperature and first solenoid valve 132A and second solenoid valve 132B are de-energized restoring regulation of flow $W_O$ of air. A cycling time of temperature probe 160 is a function of a hysteresis of temperature probe 160 and a time constant, and the function can be optimized for system operation. The ability to send a signal to first control valve assembly 104A and second control valve assembly 104B is necessary if, for example, first direct acting valve 102A was locked open due to a failure condition. Temperature probe 160 provides additional prevention of the temperature of nacelle 30 exceeding too high a temperature by monitoring the temperature of flow $W_O$ of air that is delivered to inlet 44 of nacelle 30 via anti-icing system 64.

First outlet 110A of first direct acting valve 102A is directly connected to second inlet 108B of second direct acting valve 102B forming intermediate flow chamber 164 between first outlet 110A and second inlet 108B. As flow $W_I$ of air enters into first direct acting valve 102A through first inlet 108A, a portion of flow $W_I$ of air enters into first valve chamber 114A through first orifice plug 128A in first hole 126A, and another portion of flow $W_I$ of air is diverted into first outer flow chamber 116A. As flow $W_I$ of air enters into first valve chamber 114A through first orifice plug 128A in first hole 126A, reference pressure $P_{REF}$ within first valve chamber 114A increases. As flow $W_I$ of air flows into and through first outer flow chamber 116A, flow $W_I$ of air flows through first throat 130A between first internal valve body 112A and first lip element 120A, past first lip element 120A of first piston 118A, and into intermediate flow chamber 164 formed between first outlet 110A and second inlet 108B. As flow $W_I$ of air flows past first lip element 120A of first piston 118A, flow $W_I$ of air is regulated becoming partially regulated flow $W_{PR}$ of air. As partially regulated flow $W_{PR}$ of air changes within intermediate flow chamber 164, regulated pressure $P_{REG}$ of flow $W_{PR}$ of air within intermediate flow chamber 164 also changes. In FIG. 2B, because second direct acting valve 102B is in a fully open position, regulated pressure $P_{REG}$ of flow $W_{PR}$ of air within intermediate flow chamber 164 also represents the resultant regulated pressure $P_{REG}$ of flow $W_O$ of air out of second outlet 108B due to flow $W_{PR}$ of air passing unrestricted past second lip element 114B and into second outlet 108B.

The resultant regulated pressure $P_{REG}$ of flow $W_O$ of air out of second outlet 108B can be represented by the following equation:

$$P_{REG} = P_{REF} - \frac{F_{LIP}}{A} \quad (1)$$

Where: reference pressure $P_{REF}$ is a reference pressure inside first valve chamber 114A, closing force $F_{LIP}$ is a closing force acting on first lip element 120A in an upstream direction (to the left in FIG. 2B), and A is an area of first outlet 110A (and of intermediate flow chamber 164). Closing force $F_{LIP}$ can be represented by the following equation:

$$F_{REG} = F_{REF} - F_{LIP} \quad (2)$$

Bias force $F_{REF}$ is an inlet reference bias force acting on first piston 118A in a downstream direction (to the right in FIG. 2B) from within first valve chamber 114A due to $P_{REF}$ being applied to first piston 118A. Bias force $F_{RE}G$ is an outlet regulated bias force acting on first piston 118A in an up-stream direction (to the left in FIG. 2B) from within first outlet 110A due to $P_{REG}$ being applied to first piston 118A.

As can be seen with equation (1), the amount of bias of regulated pressure $P_{REG}$ can be adjusted by varying the area of first outlet 110A, closing force $F_{LIP}$ acting on first lip element 120A, and reference pressure $P_{REF}$ inside first valve chamber 114A. As can be seen with equation (2), as closing force $F_{LIP}$ increases and bias force $F_{REF}$ remains constant, bias force $F_{REG}$ and regulated pressure $P_{REG}$ decrease. In the instance of pressure $P_{in}$ of flow $W_I$ starting with a pressure below a set-point of regulated pressure $P_{REG}$, first direct acting valve 102A is fully open and there is no closing force $F_{LIP}$. As pressure $P_{in}$ of flow $W_I$ increases, regulated pressure $P_{REG}$ would start to increase thereby causing first piston 118A to move toward a closed position in order to maintain regulated pressure $P_{REG}$ at a constant pressure. The movement of first piston 118A towards a more closed position results in an increase of closing force $F_{LIP}$ thereby causing regulated pressure $P_{REG}$ to be reduced in order to maintain a force balance applied to first lip element 120A. Closing force $F_{LIP}$ can be used to reduce regulated pressure $P_{REG}$, and thereby flow $W_O$ of air, as a function of inlet pressure so as to prevent overheating of inlet 44 of nacelle 33.

As pressure $P_{in}$ of flow $W_I$ increases, regulated bias force $F_{RE}G$ on first piston 118A increases which causes first piston 118A to move to the left of FIG. 2B. As first piston 118A moves to the left of FIG. 2B, a distance of first throat 130A between first internal valve body 112A and first lip element 120A decreases. As a distance of first throat 130A decreases, an effective area that flow $W_I$ of air passes through also decreases as air travels through first outer flow chamber 116A, past first piston 118A, and into first outlet 110A. Conversely, as $P_{REG}$ decreases, regulated bias force $F_{RE}G$ on first piston 118A decreases which causes first piston 118A to move to the right of FIG. 2B therefore increasing the effective area that flow $W_I$ of air passes through as it travels through first outer flow chamber 116A, past first piston 118A, and into first outlet 110A.

Flow $W_O$ of air is transferred out of second outlet 108B from valve assembly 100 to nacelle 30 of FIG. 1, which includes anti-icing system 64, of gas turbine engine 10. Thermal energy is then transferred from flow $W_O$ of air to nacelle 30 through anti-icing system 64 and the build-up of ice on nacelle 30, and in particular on a leading edge of inlet 44, is reduced in response to transferring thermal energy from flow $W_O$ of air to nacelle 30 and into annular shell cavity 60. For example, lower pressure $P_o$ of flow $W_O$ of air exiting out of second outlet 108B results in less flow $W_O$ of air to anti-icing system 64 and a resulting lower heat flux to nacelle 30 and thereby reducing metal temperature of inlet 44 of nacelle 30. In another example, higher pressure $P_o$ of flow $W_O$ of air exiting out of second outlet 108B results in a higher flow $W_O$ of air to anti-icing system 64 and a resulting in a higher metal temperature of inlet 44 of nacelle 30.

By changing the geometry of first and second lip elements 114A and 114B, a change in regulated pressure $P_o$ of flow $W_O$ of air as a function of pressure $P_{in}$ on flow $W_I$ of air from fluid regulation system 62 can be altered to optimize system performance. Additionally, the use of valve assembly 100 with two direct acting pressure regulating valves in series minimizes overshoots in pressure $P_o$ of flow $W_O$ of air as compared to servo actuated valves. The use of valve assembly 100 with temperature probe 160 provides additional safety features to prevent overheating inlet 44 of nacelle 30 by commanding both first direct acting valve 102A and second direct acting valve 102B closed.

Figure 2C:
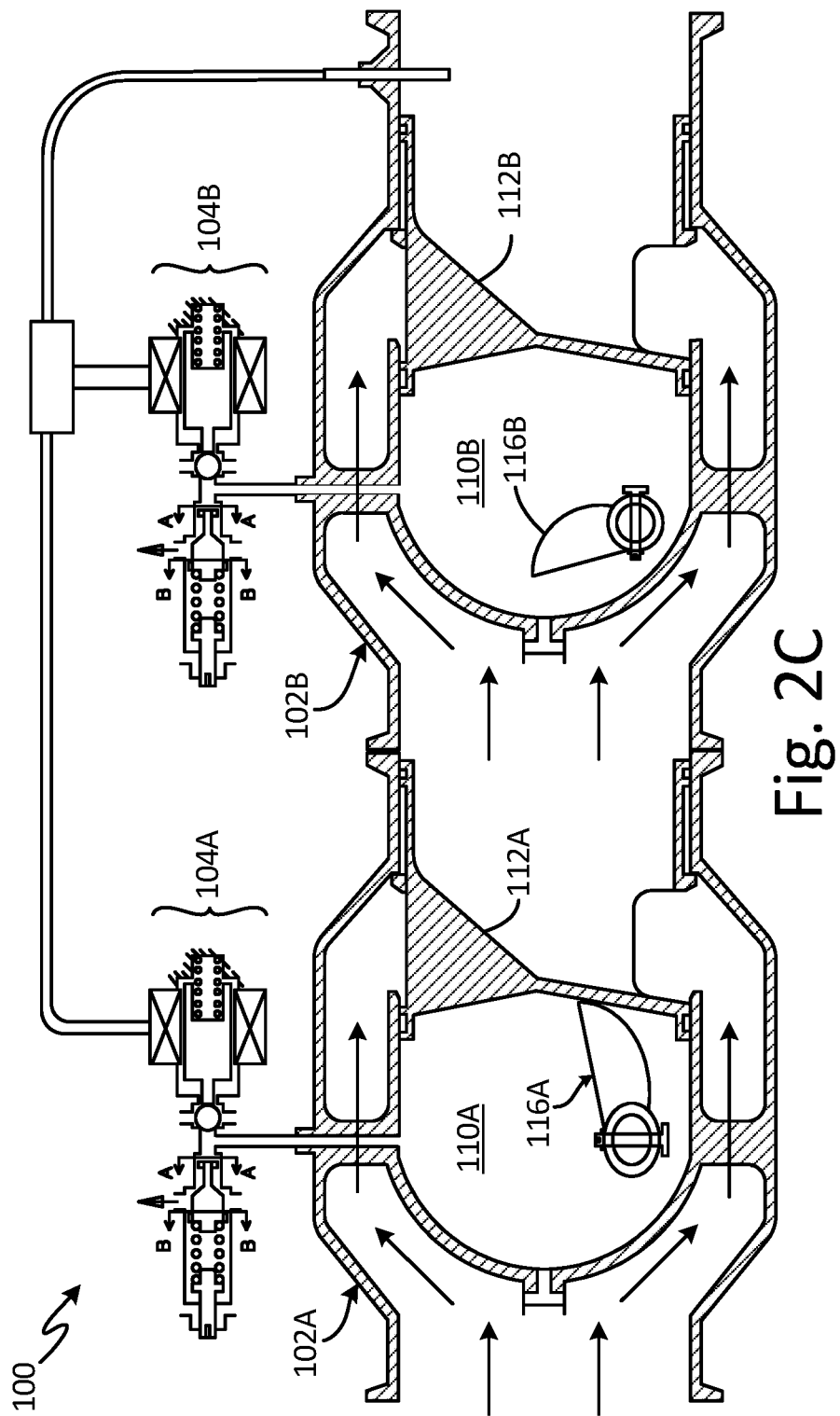
FIG. 2C is a cross-sectional view of the valve assembly with a first locking mechanism in a locked position.

FIG. 2C is a cross-sectional view of valve assembly 100 with first locking mechanism 122A in a locked position.

First locking mechanism 122A is shown in FIG. 2C as occupying a locked position in which first locking mechanism 122A is rotated approximately 90° from a position of first locking mechanism 122A shown in FIG. 2B. First locking mechanism 122A occupies a locking position due to first locking mechanism 122A being rotated to come into contact with first piston 118A thereby preventing first piston 118A from moving out of a fully open position.

Valve assembly 100 of FIG. 2C is an example of two direct acting valves in a series configuration with corresponding controllers to adjust servo pressures to modulate regulating valves and control regulated pressure. The system consists of, two of the same, direct acting type pressure regulating valves in series. In FIG. 2C first direct acting valve 102A is locked open by first locking mechanism 122A while second direct acting valve 102B is acting as the primary pressure regulating valve. With first direct acting valve 102A being locked in a fully open state, second direct acting valve 102B regulates pressure $P_o$ of flow $W_O$ of air. In one non-limiting embodiment, FIG. 2C can represent a failure condition of first control valve assembly 104A resulting in first direct acting valve 102A being locked open and second direct acting valve 102A regulating pressure $P_o$ of flow $W_O$ of air to anti-icing system 64.

In the instance of a failure of first control valve assembly 104A, second direct acting valve 102B and second control valve assembly 104B regulate flow $W_O$ of air from valve assembly 100. Using second valve assembly 104B to regulate flow $W_O$ of air from valve assembly 100 differs from normal operating conditions because under normal operating conditions, a regulation set-point of second direct acting valve 102B and second control valve assembly 104B is set higher than a regulation set-point of first direct acting valve 102A and first control valve assembly 104A. The higher regulation set-point of second direct acting valve 102B and second control valve assembly 104B results in second direct acting valve 102B remaining open under normal operating conditions while first direct acting valve 102A and first control assembly 104A regulate pressure $P_{REG}$ of flow $W_{PR}$ and resulting regulated pressure $P_{REG}$ of flow $W_O$. In some non-limiting embodiments, second pintle spring 148B can include a different spring force than first pintle spring 148A in order to cause regulation set-point of second direct acting valve 102B to be higher than the set-point In another non-limiting embodiment, both first locking mechanism 122A and second locking mechanism 116B can occupy a locked open position to prevent both first piston 118A and second piston 112B respectively from moving thereby locking first and second direct acting valves 102A and 102B in an open position allowing the pressure of flow $W_O$ of air to be unregulated.

Figure 3B:
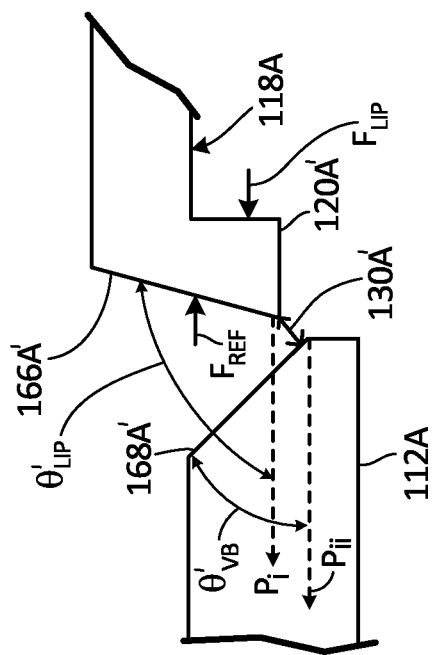
FIG. 3B is a partial cross-sectional view taken along 3-3 of FIG. 2B showing another embodiment of an interface between the internal valve body and the piston.
Figure 3A:
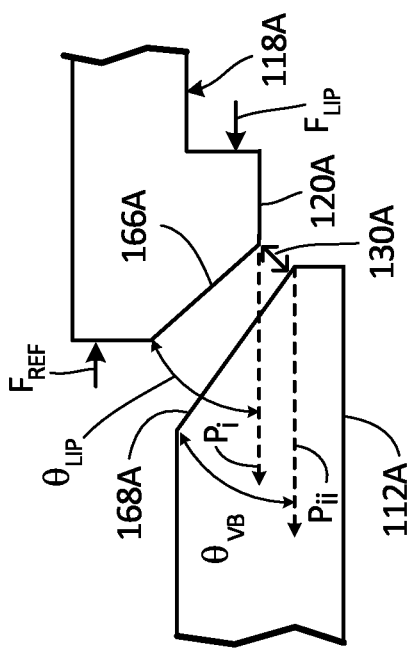
FIG. 3A is a partial cross-sectional view taken along 3-3 of FIG. 2B of one embodiment of an interface between an internal valve body and a piston.

FIG. 3A is a partial cross-sectional view taken along 3-3 in FIG. 2B of a first interface between first internal valve body 112A and first lip element 120A of first piston 118A. FIG. 3A includes first piston 118A, first lip element 120A, first internal valve body 112A, first axial face 166A of first lip element 120A, plane $P_i$, first axial face 168A of first internal valve body 112A, plane $P_{ii}$, and first throat 130A. First lip element 120A includes first axial face 166A. First internal valve body 112A includes first axial face 168A. First axial face 166A extends at angle $\theta_{LIP}$ between plane $P_i$ extending in an axial direction and first axial face 166A. First axial face 168 of first internal valve body 112A extends at angle $\theta_{VB}$ between plane $P_i$ extending in an axial direction and first axial face 168A. In one non-limiting embodiment, expansion angle $\theta_{EXP}$, equivalent to the difference between angle $\theta_{LIP}$ and angle $\theta_{VB}$, includes an angle from 15° to 60°. In FIG. 3A, angle $\theta_{LIP}$ between plane $P_i$ extending in an axial direction and first axial face 166A includes an angle of approximately 60°, angle $\theta_{VB}$ between plane $P_i$ extending in an axial direction and first axial face 168A includes an angle of approximately 45°, and expansion angle $\theta_{EXP}$ includes an angle of 15°. In other non-limiting examples, a distance of first throat 130A varies based on angles $\theta_{LIP}$ and $\theta_{VB}$. First throat 130A represents a distance between first axial face 166A of first lip element 120A and first axial face 168A of first internal valve body 112A.

As discussed above with reference to first lip element 120A in FIG. 2B, the amount of closing force $F_{LIP}$ acting on first lip element 120A can be adjusted by varying reference bias force FREE and regulated bias force $F_{REG}$ acting on first piston 118A. The distance of first throat 130A affects an effective area that flow $W_I$ of air passes through as flow $W_I$ of air travels past first lip element 120A and first internal valve body 112A which affects regulated bias force $F_{REG}$ acting on first piston 118A.

Expansion angle $\theta_{EXP}$ determines the pressure distribution downstream of first throat 130A. With a smaller expansion angle $\theta_{EXP}$, a drop in pressure across first throat 130A is not as great as the drop in pressure across first throat 130A compared to a larger expansion angle $\theta_{EXP}$. With a smaller drop in pressure across first throat 130A, a net force on first lip element 120A is less, causing a decrease in a reduction in regulated pressure $P_{REG}$ as the pressure of flow $W_I$ increases. A larger expansion angle $\theta_{EXP}$ results in a more rapid drop in pressure across first throat 130A, causing an increase in the net force on first lip element 120A, and resulting in an increased drop in regulated pressure $P_{REG}$ as the pressure of flow $W_I$ increases.

Figure 5:
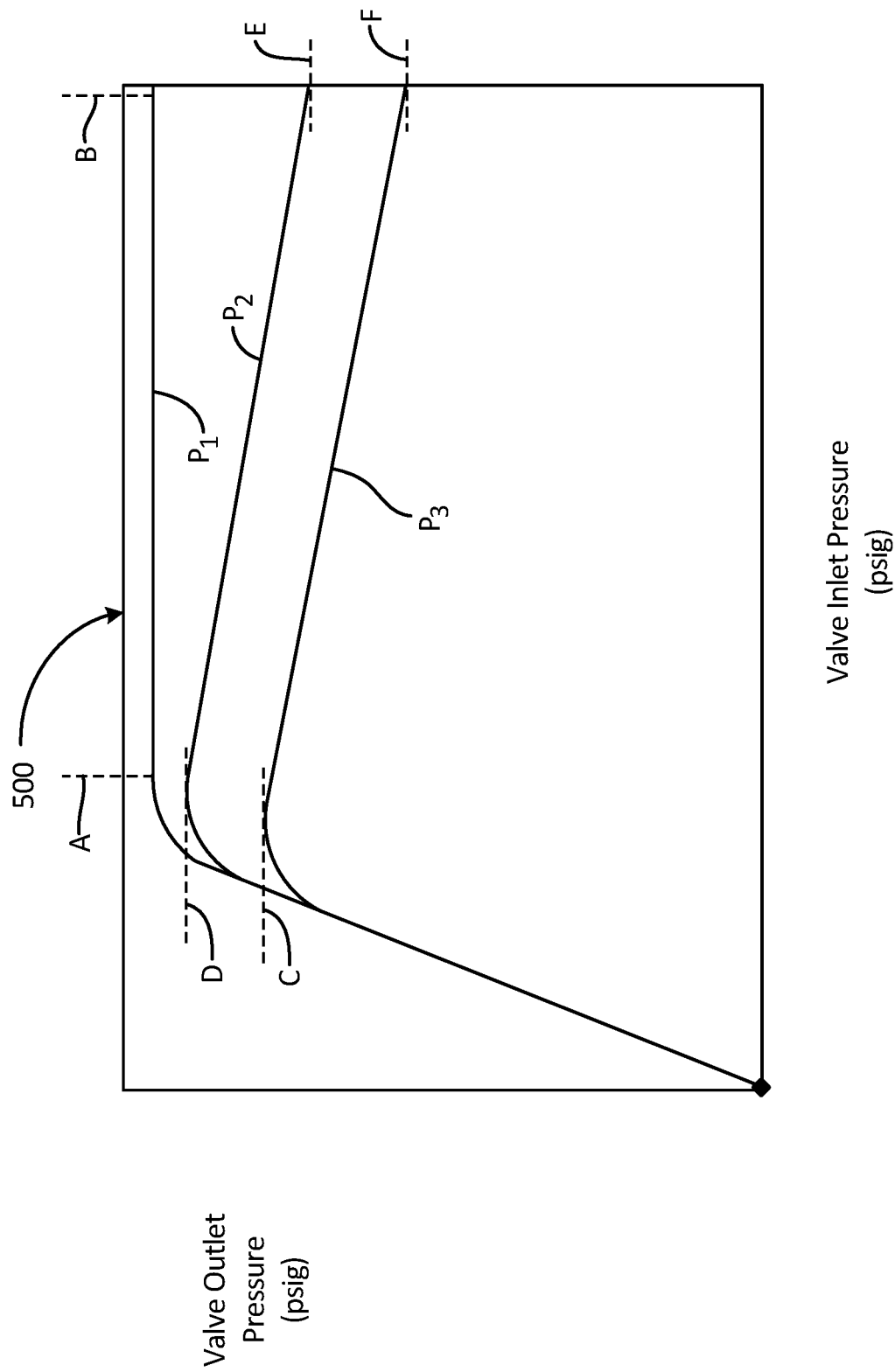
FIG. 5 is a graph of valve assembly outlet pressure as a function of valve assembly inlet pressure.

In one non-limiting example, as the distance of first throat 130A increases, the effective area that flow $W_I$ passes through as flow $W_I$ of air travels past first lip element 120A and first internal valve body 112A increases allowing a higher rate of flow $W_I$ of air past first lip element 120A and first internal valve body 112A. The higher rate of flow $W_I$ of air past first lip element 120A and first internal valve body 112A causes an increase in $P_{REG}$ which results in an increase in $F_{REG}$. The increase in $F_{REG}$ results from a decrease in $F_{LIP}$ in accordance with equation (2) (taking into account a static FREE for the purpose of the example). The decrease in $F_{LIP}$ results in an increase in $P_{REG}$ in accordance with equation (1), and a resulting higher pressure set-point of the corresponding valve assembly, such as valve assembly 100 (as seen in FIG. 5).

In another non-limiting example, as the distance of first throat 130A decreases, the effective area that flow $W_I$ of air passes through as flow $W_I$ of air travels past first lip element 120A and first internal valve body 112A decreases allowing a lower rate of flow $W_I$ of air past first lip element 120A and first internal valve body 112A. The lower rate of flow $W_I$ of air past first lip element 120A and first internal valve body 112A causes a decrease in $P_{REG}$ which results in a decrease in $F_{REG}$. The decrease in $F_{REG}$ results from an increase in $F_{LIP}$ in accordance with equation (2) (taking into account a static FREE for the purpose of the example). The increase in $F_{LIP}$ results in a decrease in $P_{REG}$ in accordance with equation (1), and a resulting lower pressure set-point of the corresponding valve assembly, such as valve assembly 100 (as seen in FIG. 5).

FIG. 3B is a partial cross-sectional view of a second interface between first internal valve body 112A and first lip element 120A' of first piston 118A. First lip element 120A' includes first axial face 166A'. First internal valve body 112A includes first axial face 168A'. First throat 130A' represents a distance between first axial face 166A' of first lip element 120A and first axial face 168A' of first internal valve body 112A. First axial face 166A extends at angle $\theta_{LIP}'$ between plane $P_i$ extending in an axial direction and first axial face 166A. First axial face 168 of first internal valve body 112A extends at angle $\theta_{VB}'$ between plane $P_i$ extending in an axial direction and first axial face 168A. In one non-limiting embodiment, expansion angle $\theta_{EXP}'$, which equivalent to the difference between angle $\theta_{LIP}'$ and angle $\theta_{VB}'$, includes an angle from 15° to 60°. In FIG. 3B, angle $\theta_{LIP}'$ between plane $P_i$ extending in an axial direction and first axial face 166A includes an angle of approximately 105°, angle $\theta_{VB}'$ between plane $P_i$ extending in an axial direction and first axial face 168A includes an angle of approximately 45°, and expansion angle $\theta_{EXP}'$ includes an angle of 60°.

Figure 4:
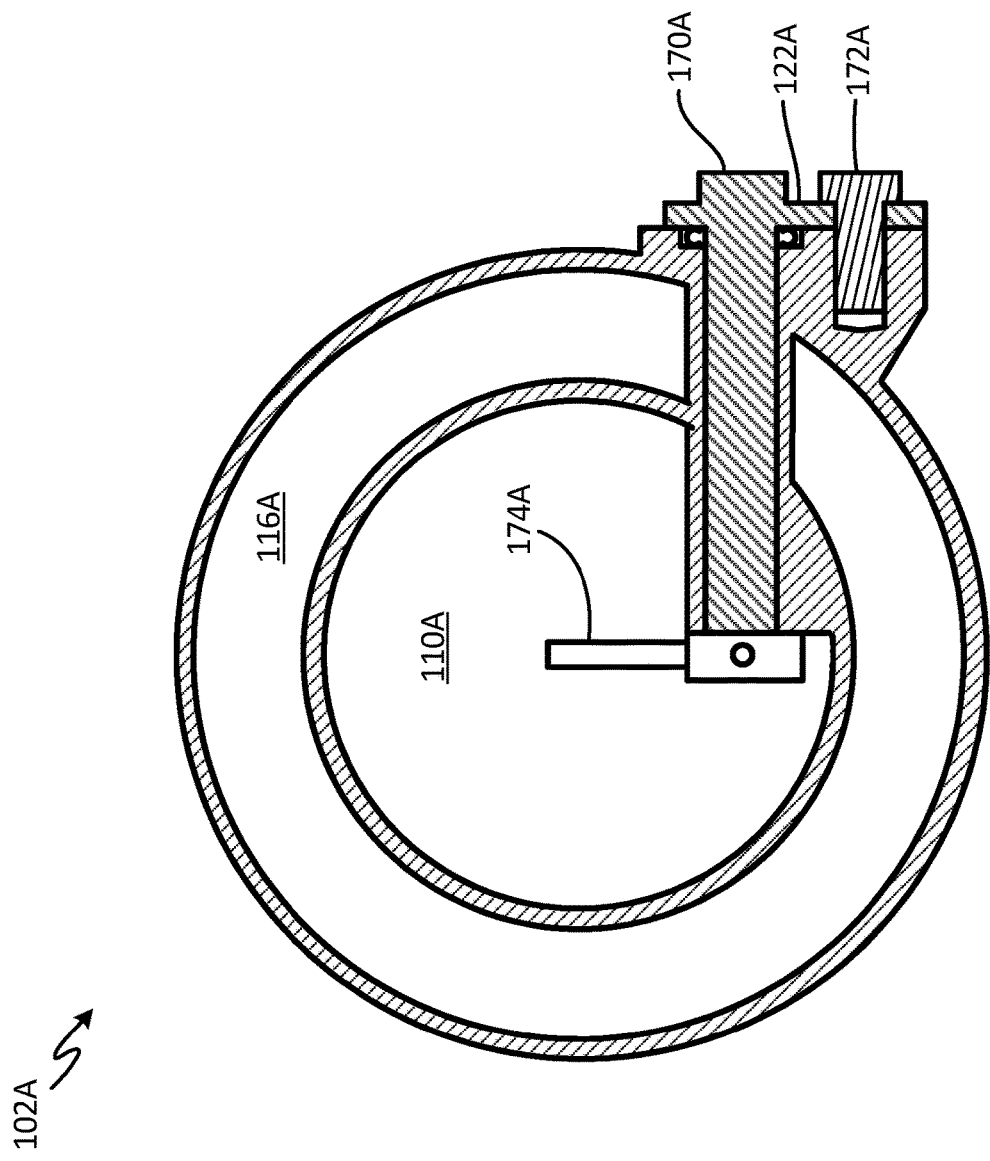
FIG. 4 is a partial cross-sectional view taken along 4-4 of FIG. 2B of a direct acting valve including a valve lock mechanism.

FIG. 4 is a cross-sectional view taken along 4-4 in FIG. 2B of first lock mechanism 122A positioned in first direct acting valve 102A. First lock mechanism 122A includes first actuation bolt 170A, first lock bolt 172A, and first lock arm 174.

First actuation bolt 170A extends into first direct acting valve 102A, through first outer flow chamber 116A, through first internal valve body 112A, and into valve chamber 110A of direct acting valve 102A. First lock arm 174A is attached to first actuation bolt 170A such that as first actuation bolt 170A is rotationally engaged from outside of direct acting valve 102A, first lock arm 174A pivots to extend towards first piston 118A (not shown in FIG. 4) to hold first piston 118A in a fully open position and prevent first piston 118A from moving (as shown in FIG. 2C). First lock mechanism 122A is shown to include first lock bolt 172A, which engages with first lock mechanism 122A to hold first actuation bolt 170A in a rotated position thereby holding first lock arm 174A in a rotated position preventing first piston 118A from moving. Upon removing first lock bolt 172A from first locking mechanism 122A, first actuation bolt 170A can be freely rotated to adjust first lock arm 174A into an original un-rotated position thereby allowing first piston 118A to freely move within first direct acting valve 102A.

FIG. 5 shows graph 500 of valve outlet pressure as a function of valve inlet pressure of valve assembly 100 shown in FIG. 2B. During engine operation, as the engine air pressure and temperature increases, valve outlet pressure increases until the valve inlet pressure achieves set point A.

In a system without a lip bias force with direct acting valves in a series configuration, such as valve assembly 100 for example, further increases to the valve inlet pressure result in a constant outlet pressure $P_1$ as indicated by the zero slope of the line between set-point A and set-point B. Without a reduction in valve outlet pressure $P_1$, the corresponding nacelle inlet temperature continues to increase as the valve inlet pressure is increased between set-point A and set-point B potentially causing damage to the nacelle of a gas turbine engine.

In a system with a valve assembly including direct acting valves in a series configuration, such as valve assembly 100 for example, once regulated pressures $P_3$ and $P_2$ reach set-points C and D respectively, further increases to the valve inlet pressure result in reduced regulated pressures $P_3$ and $P_2$ as indicated by the generally negative slopes of lines $P_3$ and $P_2$ between set-point A and set-point B. With a reduction in regulated pressure $P_{REG}$, causing a decrease in flow and reduced heat flux to the nacelle, the corresponding nacelle surface inlet temperature is maintained at a safe value as the valve inlet pressure is increased between set-point A and set-point B.

Valve assembly outlet pressure $P_3$ represents a regulated outlet pressure of a valve assembly with the first direct acting valve in a modulating state and the second direct acting valve in a fully open un-modulating state. Valve assembly outlet pressure $P_2$ represents a regulated outlet pressure of a valve assembly with the first direct acting valve in fully or locked open state and the second direct acting valve in a modulating state. As can be seen in FIG. 5, the second direct acting valve can include a higher pressure set-point than the first direct acting valve. In other non-limiting embodiments, the second direct acting valve can have the same or lower pressure set-point than the first direct acting valve. As discussed above with respect to FIGS. 2A-3B, varying the geometry of the lip element of the piston in one or both of the direct acting valves can vary the set-point of the valve assembly, as shown here in FIG. 5 as set-points C and D. Changing the geometry of first and second lip elements 120A and 120B of valve assembly 100, for example as discussed in FIGS. 3A-3B, can raise or lower set-points C and D to other target set-points, such as for example values ranging from approximately 40 psi (276 kpa) to 65 psi (448 kpa).

An example regulated pressure $P_{REG}$ value for set-point A includes a pressure of approximately 45 psi (310 kpa) and an example for set-point B includes a pressure of approximately 300 psi (2070 kpa). An example regulated pressure $P_{REG}$ value for set-point C includes a pressure of approximately 40 psi (276 kpa) and an example regulated pressure $P_{REG}$ value for set-point D includes a pressure of approximately 50 psi (345 kpa). Example ranges for the axes of graph 500 include 0-350 psi (0-2,413 kpa) along the independent (e.g. horizontal axis) with regards to valve assembly inlet pressure and 0-60 psi (0-414 kpa) along the dependent (e.g. vertical axis) with regards to the valve assembly outlet pressure. An example nacelle inlet temperature value at set-point A for regulated pressure $P_{REG}$ includes a temperature of approximately 350° F. (177° C.). An example range of normal nacelle inlet temperatures is 40° to 400° F. (4.44° to 204° C.) with regards to nacelle inlet temperature, though the nacelle inlet temperature may go as high as a maximum allowable material capability such as 750° F. (399° C.) for certain aluminum under adverse failure modes.

Additionally, as a non-limiting example, the line segments representing valve regulated pressure $P_2$ and $P_3$ can be made up of one or more of varying slopes and/or curvilinear data points.

Figure 6:
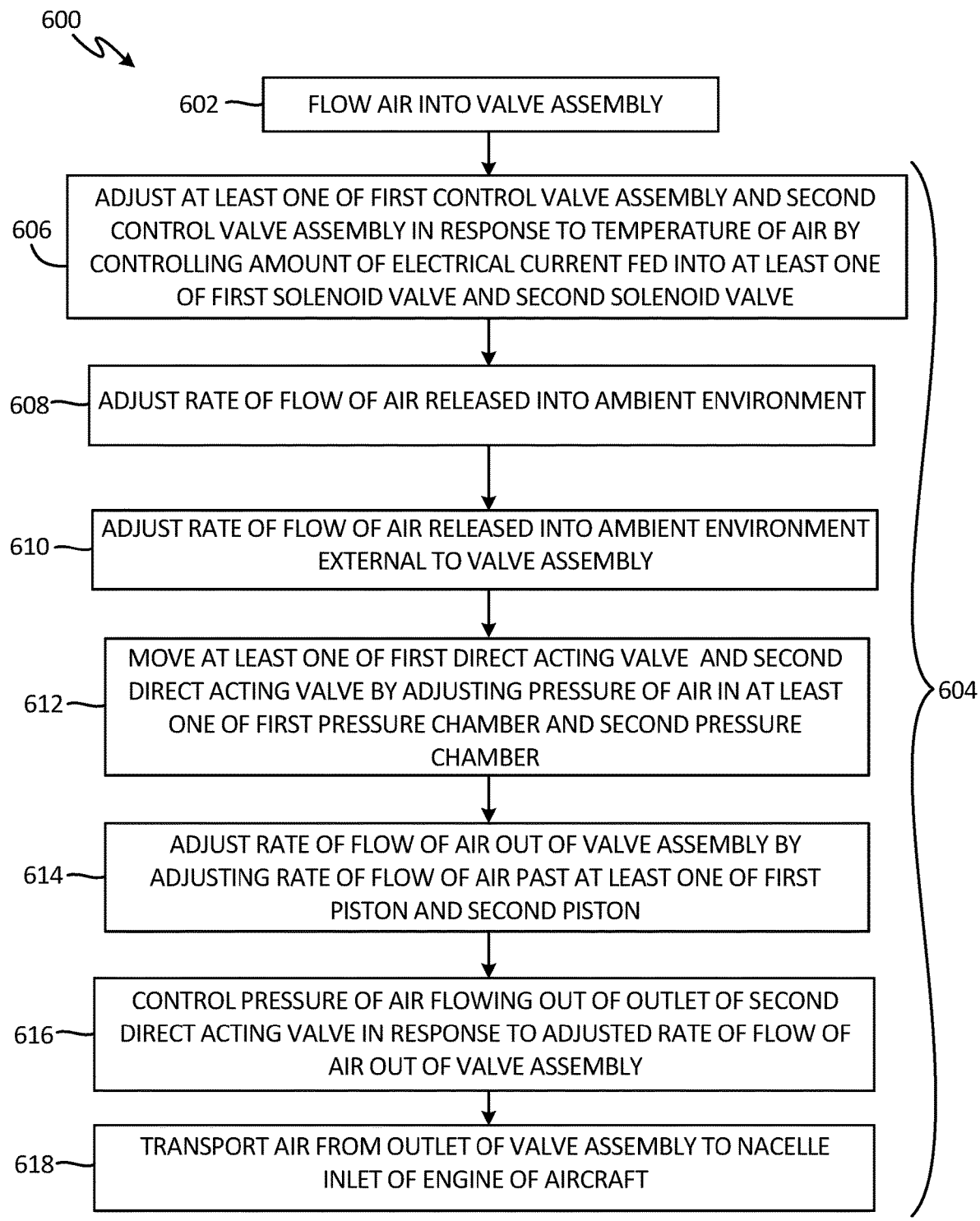
FIG. 6 is a flowchart of a method of regulating air pressure in an anti-icing system of an aircraft.

FIG. 6 is a flowchart of method 600 of regulating air pressure in an anti-icing system, for example anti-icing system 64, of an aircraft. Method 600 includes steps 602-618.

Step 602 includes flowing air into a valve assembly. The valve assembly includes a first direct acting valve, a first control valve assembly, a second direct acting valve, and a second control valve assembly. The first direct acting valve includes a first valve chamber and a first piston positioned in the first direct acting valve. The first control valve assembly is fluidly connected to the first valve chamber of the first direct acting valve. The second direct acting valve includes a second valve chamber and a second piston positioned in the second direct acting valve. The second direct acting valve is fluidly connected to the first direct acting valve in a series configuration. The second control valve assembly is fluidly connected to the second valve chamber of the second direct acting valve.

Controlling a heat flux of a nacelle inlet of an engine of an aircraft (collectively, step 604) includes steps 606-616. Step 606 includes adjusting at least one of the first control valve assembly and the second control valve assembly in response to the temperature of the air in the outlet of the second direct acting valve by controlling an amount of electrical current fed into at least one of a first solenoid valve in the first control valve assembly and a second solenoid valve in the second control valve assembly. Step 608 includes adjusting a rate of flow of air released into an ambient environment external to the valve assembly out of the at least one of the first control valve assembly and the second control valve assembly. Step 610 includes moving at least one of the first direct acting valve and the second direct acting valve by adjusting a pressure of air in at least one of the first pressure chamber of the first direct acting valve and the second pressure chamber of the second direct acting valve. Step 612 includes adjusting a rate of flow of the air out of the valve assembly by adjusting a rate of flow of air past the at least one of the first piston and the second piston. Step 614 includes controlling a pressure of air flowing out of an outlet of the second direct acting valve in response to the adjusted rate of flow of air out of the valve assembly. Step 616 includes transporting the air from the outlet of the valve assembly to the nacelle inlet of an engine of the aircraft.

Figure 7:
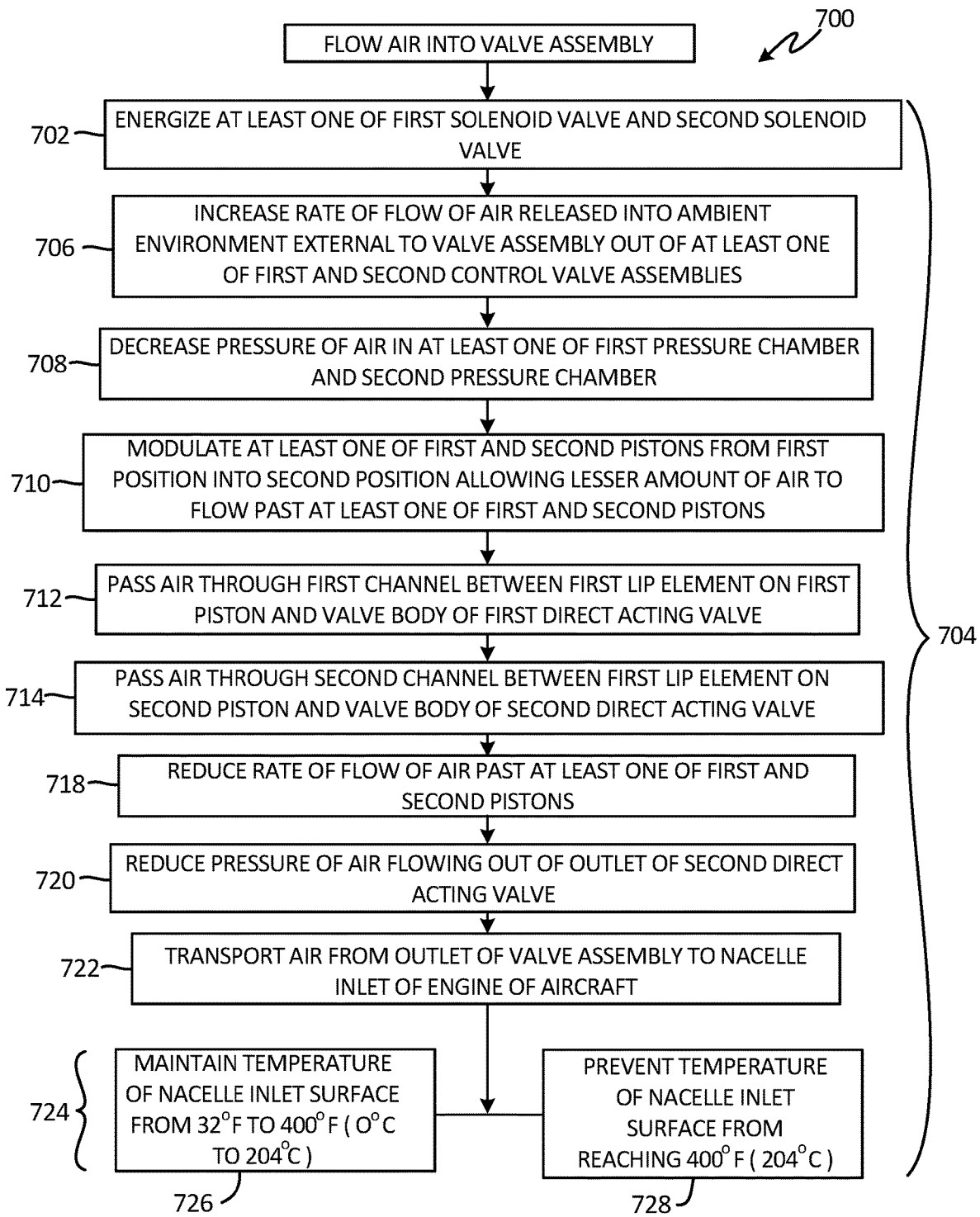
FIG. 7 is a flowchart of another method of regulating air pressure in an anti-icing system of an aircraft.

FIG. 7 is a flowchart of method 700 of regulating air pressure in an anti-icing system, for example anti-icing system 64, of a nacelle inlet of an engine of an aircraft. Method 700 includes steps 702-728. As compared to FIG. 6, FIG. 7 includes a non-limiting example discussing steps for reducing a pressure of a flow of air flowing from valve assembly 100 to anti-icing system 64.

Step 702 includes flowing air into a valve assembly including first and second direct acting valves and first and second control valve assemblies. The first direct acting valve includes a first valve chamber, a first internal valve body surrounding the first valve chamber, and a first piston slidably engaged with the first internal valve body. The first control valve assembly is fluidly connected to a first valve chamber of the first direct acting valve. The first control valve assembly includes a first solenoid with a first ball element, a first plunger attached to the first ball element, and a first solenoid surrounding the first plunger, the first solenoid for creating a magnetic field to interact with the first plunger. The second direct acting valve is fluidly connected to the first direct acting valve in a series configuration. The second direct acting valve includes a second valve chamber, a second internal valve body surrounding the second valve chamber, and a second piston slidably engaged with the second internal valve body. The second control valve assembly is fluidly connected to a second valve chamber of the second direct acting valve. The second control valve assembly includes a second solenoid with a second ball element, a second plunger attached to the second ball element, and a second solenoid surrounding the second plunger, the second solenoid for creating a magnetic field to interact with the second plunger.

Controlling a heat flux delivered to the nacelle inlet of an engine of an aircraft (collectively, step 704) includes steps 706-728.

Step 706 includes energizing at least one of a first solenoid valve in the first control valve assembly and a second solenoid valve in the second control valve assembly by feeding an electric current through the at least one of the first solenoid in the first control valve assembly and the second solenoid in the second control valve assembly.

Step 708 includes increasing a rate of flow of air released into an ambient environment external to the valve assembly out of at least one of the first control valve assembly and the second control valve assembly by opening the at least one of the first solenoid valve in the first control valve assembly and the second solenoid valve in the second control valve assembly in response to the electric current.

Step 710 includes decreasing a pressure of air in at least one of a first pressure chamber of the first direct acting valve and a second pressure chamber of the second direct acting valve by decreasing a pressure of the air in the at least one of the first control valve assembly and the second control valve assembly in response to the increased rate of flow of the air released into the ambient environment external to the valve assembly out of the at least one of the first control valve assembly and the second control valve assembly.

Step 712 includes moving the at least one of the first piston of the first direct acting valve and the second piston of the second direct acting valve from an open position into a closed position such that the closed position allows a lesser amount of air to flow past the at least one of the first piston and second piston than the open position by decreasing an effective area between the first internal valve body and the first piston or between the second internal valve body and the second piston.

Step 714 includes passing air through a first throat formed between a first lip element on the first piston and the first internal valve body of the first direct acting valve, the first lip element including a first axial face extending at an angle $\theta_{LIP}$ between a first plane extending in an axial direction and the first axial face of the first lip element, the first internal valve body including a first axial face of the first internal valve body extending at an angle $\theta_{VB}$ between a second plane extending in an axial direction and the first axial face of the first internal valve body, wherein an expansion angle $\theta_{EXP}$ equivalent to the difference between angle $\theta_{LIP}$ and angle $\theta_{VB}$ comprises an angle from 15° to 60°.

Step 716 includes passing air through a second throat formed between a second lip element on the second piston and the second internal valve body of the second direct acting valve, the second lip element including a second axial face extending at an angle $\theta_{LIP}$ between a first plane extending in an axial direction and the second axial face of the second lip element, the second internal valve body including a second axial face of the second internal valve body extending at an angle $\theta_{VB}$ between a second plane extending in an axial direction and the second axial face of the second internal valve body, wherein an expansion angle $\theta_{EXP}$ equivalent to the difference between angle $\theta_{LIP}$ and angle $\theta_{VB}$ comprises an angle from 15° to 60°.

Step 718 includes reducing a rate of flow of air past the at least one of the first piston and the second piston in response to decreasing the effective area between the first internal valve body and the first piston or between the second internal valve body and the second piston. Step 720 includes reducing a pressure of air flowing out of an outlet of the second direct acting valve in response to reducing the rate of flow of air past the at least one of the first piston and the second piston. Step 722 includes transporting the air from the outlet of the valve assembly to the nacelle inlet of the engine of the aircraft.

Step 724 can include at least one of steps 726 and 728. Step 726 includes maintaining a temperature of the nacelle inlet surface from 40° to 400° F. (4.44° to 204° C.). Step 728 includes preventing a temperature of the nacelle inlet surface from exceeding 400° F. (204° C.).

Discussion of Possible Embodiments

The following are non-exclusive descriptions of possible embodiments of the present invention.

An anti-icing system of a nacelle inlet of an engine of an aircraft can include a valve assembly fluidly connected to the nacelle inlet. The valve assembly can include first and second direct acting valves and first and second control valve assemblies. The first direct acting valve can include a first inlet, a first valve chamber fluidly connected to the first inlet, a first internal valve body circumferentially surrounding the first valve chamber, a first outlet, and/or a first piston for adjusting a rate of flow of air through the first direct acting valve. The first piston can be slidably engaged with the first internal valve body. The first control valve assembly can be fluidly connected to the first valve chamber of the first direct acting valve. The second direct acting valve can include a second inlet, a second valve chamber fluidly connected to the second inlet, a second internal valve body circumferentially surrounding the second valve chamber, a second outlet, and/or a second piston for adjusting a rate of flow of air through the second direct acting valve. The second piston can be slidably engaged with the second internal valve body. The second direct acting valve can be fluidly connected to the first direct acting valve in a series configuration such that the second inlet of the second direct acting valve can be directly connected to the first outlet of the first direct acting valve. The second control valve assembly can be fluidly connected to the second valve chamber of the second direct acting valve.

The assembly of the preceding paragraph can optionally include, additionally and/or alternatively, any one or more of the following features, configurations and/or additional components.

The first and second control valve assemblies can be electrically connected to a full authority digital engine control of the aircraft.

The first control valve assembly can comprise: a first solenoid valve with a first ball element, a first plunger attached to or in contact with the first ball element, and/or a first solenoid surrounding the first plunger, the first solenoid for creating a magnetic field to interact with the first plunger; and/or a first pintle valve with a first pintle housing, a first pintle disposed in the first pintle housing, and/or a first threadably adjustable biasing element, wherein the first pintle valve can be directly fluidly connected to the first solenoid valve, and/or wherein both of the first solenoid valve and the first pintle valve of the first control valve assembly can be fluidly connected to the first valve chamber of the first direct acting valve.

The second control valve assembly can comprise: a second solenoid valve with a second ball element, a second plunger attached to the second ball element, and/or a second solenoid surrounding the second plunger, the second solenoid for creating a magnetic field to interact with the second plunger; and/or a second pintle valve with a second pintle housing, a second pintle disposed in the second pintle housing, and/or a second threadably adjustable biasing element, wherein the second pintle valve can be directly fluidly connected to the second solenoid valve, and/or wherein both of the second solenoid valve and the second pintle valve of the second control valve assembly can be fluidly connected to the second valve chamber of the second direct acting valve.

A first lock mechanism can be positioned in the first valve chamber of the first direct acting valve, the first locking mechanism can be for locking the first piston in a fully open position, and/or a second lock mechanism positioned in the second valve chamber of the second direct acting valve, the second locking mechanism can be for locking the second piston in a fully open position.

A first lip element can be disposed on an upstream end of the first piston, the first lip element can be for sealing engagement with first internal valve body of the first direct acting valve, wherein a first axial face of the first lip element can extend at an angle $\theta_{LIP}$ between a first plane extending in an axial direction and the first axial face of the first lip element, a first axial face of the first internal valve body can extend at an angle $\theta_{VB}$ between a second plane extending in an axial direction and the first axial face of the first internal valve body, and an expansion angle $\theta_{EXP}$ equivalent to the difference between angle $\theta_{LIP}$ and angle $\theta_{VB}$ can comprise an angle from 15° to 60°.

A second lip element can be disposed on an upstream end of the second piston, the second lip element can be for sealing engagement with second internal valve body of the second direct acting valve, wherein a second axial face of the second lip element can extend at an angle $\theta_{LIP}$ between a first plane extending in an axial direction and the second axial face of the second lip element, a second axial face of the second internal valve body can extend at an angle $\theta_{VB}$ between a second plane extending in an axial direction and the second axial face of the second internal valve body, and an expansion angle $\theta_{EXP}$ equivalent to the difference between angle $\theta_{LIP}$ and angle $\theta_{VB}$ can comprise an angle from 15° to 60°.

A method of regulating air pressure in an anti-icing system of a nacelle inlet of an engine of an aircraft can include flowing air into a valve assembly. The valve assembly can include first and second direct acting valves and first and/or second control valve assemblies. The first direct acting valve can include a first valve chamber a first internal valve body, and/or a first piston slidably engaged with the first internal valve body. The first control valve assembly can be fluidly connected to the first valve chamber of the first direct acting valve. The second direct acting valve can include a second valve chamber, a second internal valve body, and/or a second piston slidably engaged with the second internal valve body. The second direct acting valve can be fluidly connected to the first direct acting valve in a series configuration. The second control valve assembly can be fluidly connected to the second valve chamber of the second direct acting valve. A heat flux of the nacelle inlet of the engine of the aircraft can be controlled by the following steps. At least one of the first control valve assembly and the second control valve assembly can be adjusted in response to the temperature of the air in the outlet of the second direct acting valve by controlling an amount of electrical current fed into at least one of a first solenoid valve in the first control valve assembly and a second solenoid valve in the second control valve assembly. A rate of flow of air released into an ambient environment external to the valve assembly out of the at least one of the first control valve assembly and the second control valve assembly can be adjusted. At least one of the first direct acting valve and the second direct acting valve can be moved by adjusting a pressure of air in at least one of the first pressure chamber of the first direct acting valve and the second pressure chamber of the second direct acting valve. A rate of flow of the air out of the valve assembly can be adjusted by adjusting a rate of flow of air past the at least one of the first piston and the second piston.

A pressure of air flowing out of an outlet of the second direct acting valve can be controlled in response to the adjusted rate of flow of air out of the valve assembly. The air from the outlet of the valve assembly can be transported to the nacelle inlet of the engine of the aircraft.

The method of the preceding paragraph can optionally include, additionally and/or alternatively, any one or more of the following features, configurations and/or additional components.

The at least one of the first solenoid valve in the first control valve assembly can be energized, the second solenoid valve in the second control valve assembly can be energized by feeding an electric current through the at least one of the first solenoid valve in the first control valve assembly and the second solenoid valve in the second control valve assembly, the rate of flow of the air released into an ambient environment external to the valve assembly out of the at least one of the first control valve assembly and the second control valve assembly can be increased assembly by opening the at least one of the first solenoid valve in the first control valve assembly and the second solenoid valve in the second control valve assembly in response to the electric current, the pressure of air in at least one of the first pressure chamber of the first direct acting valve and the second pressure chamber of the second direct acting valve can be decreased by decreasing the pressure of air in the at least one of the first control valve assembly and the second control valve assembly in response to the increased rate of flow of air released into an ambient environment external to the valve assembly out of the at least one of the first control valve assembly and the second control valve assembly, the at least one of the first piston of the first direct acting valve and the second piston of the second direct acting valve can be moved from an open position into a closed position such that the closed position allows a lesser amount of air to flow past the at least one of the first piston and second piston than the open position by decreasing an effective area between the first internal valve body and the first piston or between the second internal valve body and the second piston, the rate of flow of air past the at least one of the first piston and the second piston can be reduced in response to decreasing the effective area between the first internal valve body and the first piston or between the second internal valve body and the second piston, and/or the pressure of air flowing out of the outlet of the second direct acting valve can be reduced in response to reducing the rate of flow of air past the at least one of the first piston and the second piston.

The at least one of the first solenoid valve in the first control valve assembly and the second solenoid valve in the second control valve assembly can be de-energized by decreasing an electric current through the at least one of the first solenoid valve in the first control valve assembly and the second solenoid valve in the second control valve assembly, the rate of flow of the air released into an ambient environment external to the valve assembly out of the at least one of the first control valve assembly and the second control valve assembly can be decreased by closing the at least one of the first solenoid valve in the first control valve assembly and the second solenoid valve in the second control valve assembly in response to the electric current, the pressure of air in at least one of the first pressure chamber of the first direct acting valve and the second pressure chamber of the second direct acting valve can be increased by increasing the pressure of air in the at least one of the first control valve assembly and the second control valve assembly in response to the decreased rate of flow of air released into an ambient environment external to the valve assembly out of the at least one of the first control valve assembly and the second control valve assembly, the at least one of the first piston of the first direct acting valve and the second piston of the second direct acting valve can be moved from an closed position into a open position such that the open position allows a greater amount of air to flow past the at least one of the first piston and second piston than the open position by increasing an effective area between the first internal valve body and the first piston or between the second internal valve body and the second piston, the rate of flow of air past the at least one of the first piston and the second piston can be increased in response to increasing the effective area between the first internal valve body and the first piston or between the second internal valve body and the second piston, and/or the pressure of air flowing out of the outlet of the second direct acting valve can be increased in response to increasing the rate of flow of air past the at least one of the first piston and the second piston.

The first direct acting valve and the second direct acting valve can be closed in response to a measured temperature of the outlet of the second direct acting valve.

Upon a failure of the first direct acting valve, the first piston of the first direct acting valve can be locked in an open position.

Upon a failure of the second direct acting valve, the second piston of the second direct acting valve can be locked in an open position.

Air can be passed through a first throat formed between a first lip element on the first piston and the first internal valve body of the first direct acting valve, the first lip element can include a first axial face extending at an angle $\theta_{LIP}$ between a first plane extending in an axial direction and the first axial face of the first lip element, the first internal valve body can include a first axial face of the first internal valve body extending at an angle $\theta_{VB}$ between a second plane extending in an axial direction and the first axial face of the first internal valve body, and an expansion angle $\theta_{EXP}$ equivalent to the difference between angle $\theta_{LIP}$ and angle $\theta_{VB}$ can comprise an angle from 15° to 60°.

Air can be passed through a second throat formed between a second lip element on the second piston and the second internal valve body of the second direct acting valve, the second lip element can include a second axial face extending at an angle $\theta_{LIP}$ between a first plane extending in an axial direction and the second axial face of the second lip element, the second internal valve body can include a second axial face of the second internal valve body extending at an angle $\theta_{VB}$ between a second plane extending in an axial direction and the second axial face of the second internal valve body, and an expansion angle $\theta_{EXP}$ equivalent to the difference between angle $\theta_{LIP}$ and angle $\theta_{VB}$ can comprise an angle from 15° to 60°.

A method of regulating air pressure in an anti-icing system of a nacelle inlet of an engine of an aircraft can include flowing air into a valve assembly. The valve assembly can include first and second direct acting valves and first and second control valve assemblies. The first direct acting valve can include a first valve chamber, a first internal valve body surrounding the first valve chamber, and/or a first piston slidably engaged with the first internal valve body. The first control valve assembly can be fluidly connected to a first valve chamber of the first direct acting valve. The first control valve assembly can include a first solenoid with a first ball element, a first plunger attached to the first ball element, and/or a first solenoid surrounding the first plunger, the first solenoid can be for creating a magnetic field to interact with the first plunger. The second direct acting valve can be fluidly connected to the first direct acting valve in a series configuration. The second direct acting valve can include a second valve chamber, a second internal valve body surrounding the second valve chamber, and/or a second piston slidably engaged with the second internal valve body. The second control valve assembly can be fluidly connected to a second valve chamber of the second direct acting valve. The second control valve assembly can include a second solenoid with a second ball element, a second plunger attached to the second ball element, and/or a second solenoid surrounding the second plunger, the second solenoid for creating a magnetic field to interact with the second plunger. A heat flux of the nacelle inlet of the engine of the aircraft can be controlled with the following steps. At least one of a first solenoid valve in the first control valve assembly and a second solenoid valve in the second control valve assembly can be energized by feeding an electric current through the at least one of the first solenoid in the first control valve assembly and the second solenoid in the second control valve assembly. A rate of flow of air released into an ambient environment external to the valve assembly out of at least one of the first control valve assembly and the second control valve assembly can be increased by opening the at least one of the first solenoid valve in the first control valve assembly and the second solenoid valve in the second control valve assembly in response to the electric current. A pressure of air in at least one of a first pressure chamber of the first direct acting valve and a second pressure chamber of the second direct acting valve can be decreased by decreasing a pressure of the air in the at least one of the first control valve assembly and the second control valve assembly in response to the increased rate of flow of air released into the ambient environment external to the valve assembly out of the at least one of the first control valve assembly and the second control valve assembly. The at least one of the first piston of the first direct acting valve and the second piston of the second direct acting valve can be moved from an open position into a closed position such that the closed position allows a lesser amount of air to flow past the at least one of the first piston and second piston than the open position by decreasing an effective area between the first internal valve body and the first piston or between the second internal valve body and the second piston. A rate of flow of air past the at least one of the first piston and the second piston can be reduced in response to decreasing the effective area between the first internal valve body and the first piston or between the second internal valve body and the second piston. A pressure of air flowing out of an outlet of the second direct acting valve can be reduced in response to reducing the rate of flow of air past the at least one of the first piston and the second piston. The air from the outlet of the valve assembly can be transported to the nacelle inlet of the engine of the aircraft.

The method of the preceding paragraph can optionally include, additionally and/or alternatively, any one or more of the following features, configurations and/or additional components.

A temperature of the nacelle inlet surface can be maintained from 40° to 400° F. (4.44° to 204° C.).

A temperature of the nacelle inlet surface can be prevented from exceeding 400° F. (204° C.).

Air can be passed through a first throat formed between a first lip element on the first piston and the first internal valve body of the first direct acting valve, the first lip element can include a first axial face extending at an angle $\theta_{LIP}$ between a first plane extending in an axial direction and the first axial face of the first lip element, the first internal valve body can include a first axial face of the first internal valve body extending at an angle $\theta_{VB}$ between a second plane extending in an axial direction and the first axial face of the first internal valve body, and an expansion angle $\theta_{EXP}$ equivalent to the difference between angle $\theta_{LIP}$ and angle $\theta_{VB}$ can comprise an angle from 15° to 60°; and/or air can be passed through a second throat formed between a second lip element on the second piston and the second internal valve body of the second direct acting valve, the second lip element can include a second axial face extending at an angle $\theta_{LIP}$ between a first plane extending in an axial direction and the second axial face of the second lip element, the second internal valve body can include a second axial face of the second internal valve body extending at an angle $\theta_{VB}$ between a second plane extending in an axial direction and the second axial face of the second internal valve body, and an expansion angle $\theta_{EXP}$ equivalent to the difference between angle $\theta_{LIP}$ and angle $\theta_{VB}$ can comprise an angle from 15° to 60°.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of regulating air pressure in an anti-icing system of a nacelle inlet of an engine of an aircraft, the method comprising:
   flowing air into a valve assembly comprising:
      a first direct acting valve comprising:
         a first valve chamber;
         a first internal valve body; and
         a first piston slidably engaged with the first internal valve body;
      a first control valve assembly with a first solenoid valve and fluidly connected to the first valve chamber of the first direct acting valve;
      a second direct acting valve comprising:
         a second valve chamber;
         a second internal valve body; and
         a second piston slidably engaged with the second internal valve body, wherein the second direct acting valve is fluidly connected to the first direct acting valve in a series configuration;
      a second control valve assembly with a second solenoid valve and fluidly connected to the second valve chamber of the second direct acting valve; and
   controlling a heat flux of the nacelle inlet of the engine of the aircraft, wherein controlling the heat flux of the nacelle inlet of the engine of the aircraft comprises:
      adjusting at least one of the first control valve assembly and the second control valve assembly in response to the temperature of the air in an outlet of the second direct acting valve by controlling an amount of electric current fed into at least one of the first solenoid valve in the first control valve assembly and the second solenoid valve in the second control valve assembly;
      adjusting a rate of flow of air released into an ambient environment external to the valve assembly out of the at least one of the first control valve assembly and the second control valve assembly;

moving at least one of the first direct acting valve and the second direct acting valve by adjusting a pressure of air in at least one of the first valve chamber of the first direct acting valve and the second valve chamber of the second direct acting valve;

adjusting a rate of flow of the air out of the valve assembly by adjusting a rate of flow of air past the at least one of the first piston and the second piston;

controlling a pressure of air flowing out of the outlet of the second direct acting valve in response to the adjusted rate of flow of air out of the valve assembly;

transporting the air from the outlet of the valve assembly to the nacelle inlet of the engine of the aircraft; and passing air through at least one of a first throat formed between a first lip element on the first piston and the first internal valve body of the first direct acting valve and a second throat formed between a second lip element on the second piston and the second internal valve body of the second direct acting valve, the at least one of the first lip element and second lip element including a first axial face extending at an angle $\theta_{LIP}$ between a first plane extending in an axial direction and the first axial face, at least one of the first internal valve body and the second internal valve body including a second axial face extending at an angle $\theta_{VB}$ between a second plane extending in an axial direction and the second axial face, wherein an expansion angle $\theta_{EXP}$ equivalent to the difference between angle $\theta_{LIP}$ and angle $\theta_{VB}$ comprises an angle from 15° to 60°.

2. The method of claim 1, further comprising:

energizing the at least one of the first solenoid valve in the first control valve assembly and the second solenoid valve in the second control valve assembly by feeding an electric current through the at least one of the first solenoid valve in the first control valve assembly and the second solenoid valve in the second control valve assembly;

increasing the rate of flow of the air released into an ambient environment external to the valve assembly out of the at least one of the first control valve assembly and the second control valve assembly by opening the at least one of the first solenoid valve in the first control valve assembly and the second solenoid valve in the second control valve assembly in response to the electric current;

decreasing the pressure of air in at least one of the first valve chamber of the first direct acting valve and the second valve chamber of the second direct acting valve by decreasing the pressure of air in the at least one of the first control valve assembly and the second control valve assembly in response to the increased rate of flow of air released into an ambient environment external to the valve assembly out of the at least one of the first control valve assembly and the second control valve assembly;

moving the at least one of the first piston of the first direct acting valve and the second piston of the second direct acting valve from an open position into a closed position such that the closed position allows a lesser amount of air to flow past the at least one of the first piston and second piston than the open position by decreasing an effective area between the first internal valve body and the first piston or between the second internal valve body and the second piston;

reducing the rate of flow of air past the at least one of the first piston and the second piston in response to decreasing the effective area between the first internal valve body and the first piston or between the second internal valve body and the second piston; and reducing the pressure of air flowing out of the outlet of the second direct acting valve in response to reducing the rate of flow of air past the at least one of the first piston and the second piston.

3. The method of claim 1, further comprising:

de-energizing the at least one of the first solenoid valve in the first control valve assembly and the second solenoid valve in the second control valve assembly by decreasing an electric current through the at least one of the first solenoid valve in the first control valve assembly and the second solenoid valve in the second control valve assembly;

decreasing the rate of flow of the air released into an ambient environment external to the valve assembly out of the at least one of the first control valve assembly and the second control valve assembly by closing the at least one of the first solenoid valve in the first control valve assembly and the second solenoid valve in the second control valve assembly in response to the electric current;

increasing the pressure of air in at least one of the first valve chamber of the first direct acting valve and the second valve chamber of the second direct acting valve by increasing the pressure of air in the at least one of the first control valve assembly and the second control valve assembly in response to the decreased rate of flow of air released into an ambient environment external to the valve assembly out of the at least one of the first control valve assembly and the second control valve assembly;

moving the at least one of the first piston of the first direct acting valve and the second piston of the second direct acting valve from an open position into a closed position such that the closed position allows a greater amount of air to flow past the at least one of the first piston and second piston than the open position by increasing an effective area between the first internal valve body and the first piston or between the second internal valve body and the second piston;

increasing the rate of flow of air past the at least one of the first piston and the second piston in response to increasing the effective area between the first internal valve body and the first piston or between the second internal valve body and the second piston; and increasing the pressure of air flowing out of the outlet of the second direct acting valve in response to increasing the rate of flow of air past the at least one of the first piston and the second piston.

4. The method of claim 1, further comprising:

closing the first direct acting valve and the second direct acting valve in response to a measured temperature of the outlet of the second direct acting valve.

5. The method of claim 1, wherein upon a failure of the first direct acting valve, locking the first piston of the first direct acting valve in an open position.

6. The method of claim 1, wherein upon a failure of the second direct acting valve, locking the second piston of the second direct acting valve in an open position.

7. The method of claim 1, further comprising:
passing air through the first throat formed between a first lip element on the first piston and the first internal valve body of the first direct acting valve; and
passing air through the second throat formed between a second lip element on the second piston and the second internal valve body of the second direct acting valve.

8. The method of claim 1, wherein the first direct acting valve further comprises:
a first inlet;
a first upstream wall, wherein the first valve chamber is bounded in an upstream direction by the first upstream wall and is fluidly connected to the first inlet; and
a first hole positioned on the first upstream wall, wherein the first hole fluidly connects the first inlet with the first valve chamber; and
wherein the second direct acting valve further comprises:
a second inlet;
a second upstream wall, wherein the second valve chamber is bounded in an upstream direction by the second upstream wall and is fluidly connected to the second inlet; and
a second hole positioned on the second upstream wall, wherein the second hole fluidly connects the second inlet with the second valve chamber; and
wherein controlling a heat flux of the nacelle inlet of the engine of the aircraft comprises:
adjusting a pressure within at least one of the first valve chamber and the second valve chamber by flowing air through at least one of the first hole and into the first valve chamber and the second hole and into the second valve chamber.

9. The method of claim 8, further comprising adjusting a pressure within each of the first valve chamber and the second valve chamber by flowing air through the first hole and into the first valve chamber and flowing air through the second hole and into the second valve chamber, wherein the second inlet is in direct fluid communication with an outlet of the first direct acting valve.

10. A method of regulating air pressure in an anti-icing system of a nacelle inlet of an engine of an aircraft, the method comprising:
flowing air into a valve assembly comprising:
a first direct acting valve comprising:
a first valve chamber;
a first internal valve body surrounding the first valve chamber; and
a first piston slidably engaged with the first internal valve body;
a first control valve assembly fluidly connected to the first valve chamber of the first direct acting valve, the first control valve assembly with a first solenoid valve comprising:
a first ball element;
a first plunger attached to the first ball element; and
a first solenoid surrounding the first plunger, the first solenoid for creating a magnetic field to interact with the first plunger; and;
a second direct acting valve fluidly connected to the first direct acting valve in a series configuration, the second direct acting valve comprising:
a second valve chamber;
a second internal valve body surrounding the second valve chamber; and
a second piston slidably engaged with the second internal valve body;
a second control valve assembly fluidly connected to the second valve chamber of the second direct acting valve, the second control valve assembly with a second solenoid valve comprising:
a second ball element;
a second plunger attached to the second ball element; and
a second solenoid surrounding the second plunger, the second solenoid for creating a magnetic field to interact with the second plunger;
controlling a heat flux of the nacelle inlet of the engine of the aircraft; wherein controlling a heat flux of the nacelle inlet of the engine of the aircraft comprises:
energizing the at least one of the first solenoid in the first control valve assembly and the second solenoid in the second control valve assembly by feeding an electric current through the at least one of the first solenoid in the first control valve assembly and the second solenoid in the second control valve assembly;
increasing a rate of flow of air released into an ambient environment external to the valve assembly out of the at least one of the first control valve assembly and the second control valve assembly by opening the at least one of the first solenoid valve in the first control valve assembly and the second solenoid valve in the second control valve assembly in response to the electric current;
decreasing a pressure of air in at least one of the first valve chamber of the first direct acting valve and the second valve chamber of the second direct acting valve by decreasing a pressure of the air in the at least one of the first control valve assembly and the second control valve assembly in response to the increased rate of flow of air released into the ambient environment external to the valve assembly out of the at least one of the first control valve assembly and the second control valve assembly;
moving the at least one of the first piston of the first direct acting valve and the second piston of the second direct acting valve from an open position into a closed position such that the closed position allows a lesser amount of air to flow past the at least one of the first piston and second piston than the open position by decreasing an effective area between the first internal valve body and the first piston or between the second internal valve body and the second piston;
reducing the rate of flow of air past the at least one of the first piston and the second piston in response to decreasing the effective area between the first internal valve body and the first piston or between the second internal valve body and the second piston;
reducing the pressure of air flowing out of the outlet of the second direct acting valve in response to reducing the rate of flow of air past the at least one of the first piston and the second piston;
transporting the air from the outlet of the valve assembly to the nacelle inlet of an engine of the aircraft, and
passing air through at least one of a first throat formed between a first lip element on the first piston and the first internal valve body of the first direct acting valve and a second throat formed between a second lip element on the second piston and the second internal valve body of the second direct acting valve, the at least one of the first lip element and second lip element including a first axial face extending at an angle $\theta_{LIP}$ between a first plane extending in an axial direction and the first axial face, at least one of the first internal valve body and the second internal valve body including a second axial face extending at an angle $\theta_{VB}$ between a second plane extending in an axial direction and the second axial face, wherein an expansion angle $\theta_{EXP}$ equivalent to the difference between angle $\theta_{LIP}$ and angle $\theta_{VB}$ comprises an angle from 15° to 60°.

11. The method of claim 10, further comprising:
maintaining a temperature of the nacelle inlet surface from 40° to 400° F. (4.44° to 204° C.).

12. The method of claim 10, further comprising:
preventing a temperature of the nacelle inlet surface from exceeding 400° F. (204° C.).

13. The method of claim 10, further comprising:
passing air through the first throat formed between a first lip element on the first piston and the first internal valve body of the first direct acting valve; and
passing air through the second throat formed between a second lip element on the second piston and the second internal valve body of the second direct acting valve.

14. The method of claim 10, wherein the first direct acting valve further comprises:
a first inlet;
a first upstream wall, wherein the first valve chamber is bounded in an upstream direction by the first upstream wall and is fluidly connected to the first inlet; and
a first hole positioned on the first upstream wall, wherein the first hole fluidly connects the first inlet with the first valve chamber; and
wherein the second direct acting valve further comprises:
a second inlet;
a second upstream wall, wherein the second valve chamber is bounded in an upstream direction by the second upstream wall and is fluidly connected to the second inlet; and
a second hole positioned on the second upstream wall, wherein the second hole fluidly connects the second inlet with the second valve chamber; and
wherein controlling a heat flux of the nacelle inlet of the engine of the aircraft comprises:
adjusting a pressure within at least one of the first valve chamber and the second valve chamber by flowing air through at least one of the first hole and into the first valve chamber and the second hole and into the second valve chamber.

15. The method of claim 14, further comprising adjusting a pressure within each of the first valve chamber and the second valve chamber by flowing air through the first hole and into the first valve chamber and flowing air through the second hole and into the second valve chamber wherein the second inlet is in direct fluid communication with an outlet of the first direct acting valve.

* * * * *

UNITED STATES PATENT AND TRADEMARK OFFICE
CERTIFICATE OF CORRECTION

PATENT NO. : 11,060,454 B2
APPLICATION NO. : 16/567665
DATED : July 13, 2021
INVENTOR(S) : Robert Goodman, Zhijun Zheng and Michael D. Greenberg Page 1 of 1

It is certified that error appears in the above-identified patent and that said Letters Patent is hereby corrected as shown below:

In the Specification

Column 14, Line 60:
Delete "FREE"
Insert --FsubRef--

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*